US010027957B2

(12) United States Patent
Lim et al.

(10) Patent No.: US 10,027,957 B2
(45) Date of Patent: Jul. 17, 2018

(54) METHODS AND APPARATUSES FOR ENCODING AND DECODING VIDEO USING MULTIPLE REFERENCE PICTURES

(75) Inventors: Chong Soon Lim, Singapore (SG); Viktor Wahadaniah, Singapore (SG); Sue Mon Thet Naing, Singapore (SG); Takahiro Nishi, Nara (JP); Youji Shibahara, Osaka (JP); Hisao Sasai, Osaka (JP); Toshiyasu Sugio, Osaka (JP)

(73) Assignee: Sun Patent Trust, New York, NY (US)

( * ) Notice: Subject to any disclaimer, the term of this patent is extended or adjusted under 35 U.S.C. 154(b) by 352 days.

(21) Appl. No.: 13/978,633

(22) PCT Filed: Jan. 12, 2012

(86) PCT No.: PCT/JP2012/000144
§ 371 (c)(1),
(2), (4) Date: Jul. 8, 2013

(87) PCT Pub. No.: WO2012/096176
PCT Pub. Date: Jul. 19, 2012

(65) Prior Publication Data
US 2013/0294520 A1    Nov. 7, 2013

Related U.S. Application Data

(60) Provisional application No. 61/431,885, filed on Jan. 12, 2011.

(51) Int. Cl.
*H04N 7/36*    (2006.01)
*H04N 19/583*    (2014.01)
(Continued)

(52) U.S. Cl.
CPC ....... *H04N 19/00727* (2013.01); *H04N 19/46* (2014.11); *H04N 19/573* (2014.11); *H04N 19/58* (2014.11)

(58) Field of Classification Search
CPC .. H04N 7/50; H04N 7/26244; H04N 7/26335; H04N 7/26941
See application file for complete search history.

(56) References Cited

U.S. PATENT DOCUMENTS 7,400,681 B2 *  7/2008  Joch ................. H04N 19/51
                                                      375/240.16
7,773,675 B2    8/2010  Park et al.
(Continued)

FOREIGN PATENT DOCUMENTS

JP    2005-151167    6/2005
JP    2006-121224    5/2006
(Continued)

OTHER PUBLICATIONS

Recommendation ITU-T H.264 (Mar. 2005), Series H: Audiovisual and Multimedia Systems, Infrastructure of audiovisual services—Coding of moving video, Advanced video coding for generic audiovisual services, Telecommunication Standardization Sector of ITU, Mar. 2010, pp. 48, 82-85, 106-112.
(Continued)

*Primary Examiner* — Shawn An
(74) *Attorney, Agent, or Firm* — Wenderoth, Lind & Ponack, L.L.P.

(57) ABSTRACT

A method of encoding video using a plurality of reference pictures is provided. The method includes: writing one of a parameter or a flag into one or more reference pictures of the plurality of reference pictures, creating a first list of reference pictures comprising the plurality of reference pictures sorted based on the parameter or flag, and encoding a current picture of the video using at least the first list of reference
(Continued)

pictures. A method of decoding video using a plurality of reference pictures is also provided. The method includes parsing one of a parameter or flag from one or more reference pictures of the plurality of reference pictures, creating a first list of reference pictures comprising the plurality of reference pictures sorted based on the parameter or flag, and decoding a current picture of the video using at least the first list of reference pictures. In addition, there are provided corresponding apparatuses for encoding and decoding video.

6 Claims, 40 Drawing Sheets

(51) Int. Cl.
*H04N 19/46* (2014.01)
*H04N 19/573* (2014.01)
*H04N 19/58* (2014.01)

(56) References Cited

U.S. PATENT DOCUMENTS

| | | |
|---|---|---|
| 7,835,438 B2 | 11/2010 | Chono |
| 7,869,501 B2 | 1/2011 | Park et al. |
| 7,929,605 B2 | 4/2011 | Kimata et al. |
| 8,275,034 B2 | 9/2012 | Sakamoto |
| 8,488,891 B2 | 7/2013 | Choi et al. |
| 8,532,412 B2 | 9/2013 | Choi et al. |
| 8,548,261 B2 | 10/2013 | Choi et al. |
| 8,554,002 B2 | 10/2013 | Choi et al. |
| 8,611,688 B2 | 12/2013 | Choi et al. |
| 8,644,628 B2 | 2/2014 | Choi et al. |
| 8,670,626 B2 | 3/2014 | Choi et al. |
| 8,693,539 B2 | 4/2014 | Lim et al. |
| 8,711,931 B2 | 4/2014 | Tanaka et al. |
| 8,948,256 B2 | 2/2015 | Pandit et al. |
| 9,088,779 B2 | 7/2015 | Choi et al. |
| 9,641,839 B2 * | 5/2017 | Joch .................. H04N 19/51 |
| 2006/0013305 A1 | 1/2006 | Sun |
| 2006/0159174 A1 | 7/2006 | Chono |
| 2007/0086518 A1 | 4/2007 | Jeon et al. |
| 2007/0098068 A1 | 5/2007 | Kimata et al. |
| 2007/0147493 A1 | 6/2007 | Jeon et al. |
| 2007/0147500 A1 | 6/2007 | Chono |
| 2007/0183494 A1 | 8/2007 | Hannuksela |
| 2007/0195879 A1 | 8/2007 | Jeon et al. |
| 2007/0195886 A1 | 8/2007 | Sakamoto |
| 2007/0230914 A1 * | 10/2007 | Garrido .............. H04N 7/0125 |
| | | 386/264 |
| 2007/0237239 A1 | 10/2007 | Jeon et al. |
| 2007/0253486 A1 | 11/2007 | Jeon et al. |
| 2008/0253671 A1 | 10/2008 | Choi et al. |
| 2009/0003445 A1 | 1/2009 | Ying et al. |
| 2009/0010323 A1 | 1/2009 | Su et al. |
| 2009/0067496 A1 | 3/2009 | Ying et al. |
| 2009/0129468 A1 | 5/2009 | Park et al. |
| 2009/0147857 A1 | 6/2009 | Park et al. |
| 2009/0225866 A1 | 9/2009 | Park et al. |
| 2009/0262804 A1 | 10/2009 | Pandit et al. |
| 2009/0323801 A1 | 12/2009 | Imajou |
| 2010/0074323 A1 * | 3/2010 | Fu .................... H04N 19/147 |
| | | 375/240.02 |
| 2010/0091845 A1 | 4/2010 | Jeon et al. |
| 2010/0118944 A1 | 5/2010 | Tanaka et al. |
| 2010/0135385 A1 | 6/2010 | Park et al. |
| 2010/0150236 A1 | 6/2010 | Koo et al. |
| 2010/0158113 A1 * | 6/2010 | Koo .................... H04N 19/597 |
| | | 375/240.12 |
| 2010/0246674 A1 | 9/2010 | Park et al. |
| 2011/0090960 A1 | 4/2011 | Leontaris et al. |
| 2011/0096835 A1 | 4/2011 | Lim et al. |
| 2011/0110434 A1 | 5/2011 | Park et al. |
| 2012/0020407 A1 * | 1/2012 | Liu .................... H04N 19/61 |
| | | 375/240.01 |
| 2012/0027088 A1 | 2/2012 | Chien et al. |
| 2012/0027089 A1 | 2/2012 | Chien et al. |
| 2012/0147137 A1 * | 6/2012 | Jeon .................. H04N 21/2365 |
| | | 348/43 |
| 2012/0148166 A1 | 6/2012 | Choi et al. |
| 2012/0148167 A1 | 6/2012 | Choi et al. |
| 2012/0148168 A1 | 6/2012 | Choi et al. |
| 2012/0148169 A1 | 6/2012 | Choi et al. |
| 2012/0148170 A1 | 6/2012 | Choi et al. |
| 2012/0155782 A1 | 6/2012 | Choi et al. |
| 2012/0328005 A1 | 12/2012 | Yu et al. |
| 2014/0132719 A1 | 5/2014 | Choi et al. |

FOREIGN PATENT DOCUMENTS

| | | |
|---|---|---|
| JP | 2007-228077 | 9/2007 |
| JP | 2008-219204 | 9/2008 |
| JP | 2010-010959 | 1/2010 |
| JP | 2010-524381 | 7/2010 |
| WO | 2005/011285 | 2/2005 |
| WO | 2005/062625 | 7/2005 |
| WO | 2005/064947 | 7/2005 |
| WO | 2007/040336 | 4/2007 |
| WO | 2010/109904 | 9/2010 |
| WO | 2012/015649 | 2/2012 |

OTHER PUBLICATIONS

Bin Li et al., "Redundancy reduction in B-frame coding at temporal level zero", Joint Collaborative Team on Video Coding (JCT-VC) of ITU-T SG16 WP3 and ISO/IEC JTC1/SC29/WG11, 3rd Meeting: Guangzhou, CN, Oct. 2010, JCTVC-C278_r3, pp. 1-9.

Wei-Jung Chien et al., "Modified Uni-directional Inter Prediction in Generalized P and B Picture", Joint Collaborative Team on Video Coding (JCT-VC) of ITU-T SG16 WP3 and ISO/IEC JTC1/SC29/WG11, 3rd Meeting: Guangzhou, CN, Oct. 2010, JCTVC-C285, pp. 1-2.

Chong Soon Lim et al., "Reference Lists for B Pictures Under Low Delay Constraints", Joint Collaborative Team on Video Coding (JCT-VC) of ITU-T SG16 WP3 and ISO/IEC JTC1/SC29/WG11, 4th Meeting: Daegu, KR, Jan. 2011, JCTVC-D093_r1, pp. 1-9.

Chong Soon Lim et al., "Reference Lists for Low Delay Settings", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F433_r1, pp. 1-9.

Chong Soon Lim et al., "Reference Lists for B Pictures Under Low Delay Constraints", Joint Collaborative Team on Video Coding (JCT-VC) of ITU-T SG16 WP3 and ISO/IEC JTC1/SC29/WG11 4th Meeting: Daegu, KR, Jan. 20-28, 2011, US, JCTVC, Jan. 14, 2011, JCTVC-D093, p. 1-p. 7, URL, http://phenix.it-sudparis.eu/jct/index.php.

International Search Report dated Apr. 17, 2012 in International Application No. PCT/JP2012/000144.

Written Opinion of the International Searching Authority dated Apr. 17, 2012 in International Application No. PCT/JP2012/000144.

ISO/IEC 14496-10 (MPEG-4 Part 10: Advanced Video Coding), Oct. 1, 2004.

"Advanced video coding for generic audiovisual services", ITU-T Recommendation H. 264, Mar. 2009, p. 120-126.

Hideaki Kimata et al., "Temporal Scalable Video Coding with Hierarchical Reference Picture Selection Method", The IEICE Transactions on Fundamentals of Electronics, Communications and Computer Sciences (Japanese), Mar. 2005, vol. J88-A, No. 3, p. 397-410, with its partial translation.

Hideaki Kimata et al., "Hierarchical Reference Picture Selection Method for Temporal Scalability beyond H.264", 2004 IEEE International Conference on Multimedia and Expo, 2004, ICME'04., Jun. 27, 2004, vol. 1, p. 181-184.

Hideaki Kimata et al., "Reference Picture Selection Prediction for Temporal Scalability", The Proceedings of the 18th Picture Coding Symposium of Japan, Nov. 14, 2003, pp. 55-56.

Heiko Schwarz et al., "Hierarchical B Pictures", Joint Video Team

(56) References Cited

OTHER PUBLICATIONS (JVT) of ISO/IEC MPEG & ITU-T VCEG (ISO/IEC JTC1/SC29/WG11 and ITU-T SG16 Q.6) 16th Meeting: Poznan, PL, Document: JVT-P014, ITU-T, Jul. 2005.

Heiko Schwarz et al., Overview of the Scalable Video Coding Extension of the H.264/AVC Standard, IEEE Transactions on Circuits and Systems for Video Technology, Sep. 2007, vol. 17, No. 9, p. 1103-1120.

Jill Boyce and Danny Hong, High layer syntax to improve support for temporal scalability, Joint Collaborative Team on Video Coding (JCT-VC) of ITU-T SG16 WP3 and ISO/IEC JTC1/SC29/WG11 4th Meeting: Daegu, KR, Document: JCTVC-D200, ITU-T, Jan. 2011.

Toshiyasu Sugio and Takahiro Nishi, "Modified usage of predicted motion vectors in forward directional bi-predictive coding frame", Joint Collaborative Team on Video Coding (JCT-VC) of ITU-T SG16 WP3 and ISO/IEC JTC1/SC29/WG11 4th Meeting: Daegu, KR, Document: JCTVC-D274, ITU-T, Jan. 2011.

Office Action dated May 5, 2016 in corresponding U.S. Appl. No. 13/983,581.

Office Action dated Jan. 14, 2016 in related U.S. Appl. No. 13/983,581.

Office Action dated Aug. 23, 2016 in U.S. Appl. No. 13/983,581.

Ying Chen et al., "The Emerging MVC Standard for 3D Video Services", Hindawi Publishing Corporation, EURASIP Journal on Advances in Signal Processing, vol. 2009, Article ID 786015, 13 pages.

Office Action dated Apr. 17, 2017 in U.S. Appl. No. 13/983,581.

\* cited by examiner

[Fig. 1]
Prior Art
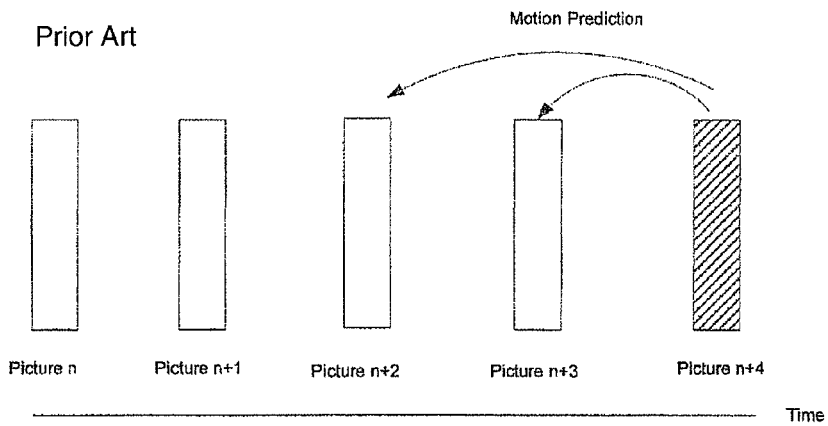
[Fig. 2]
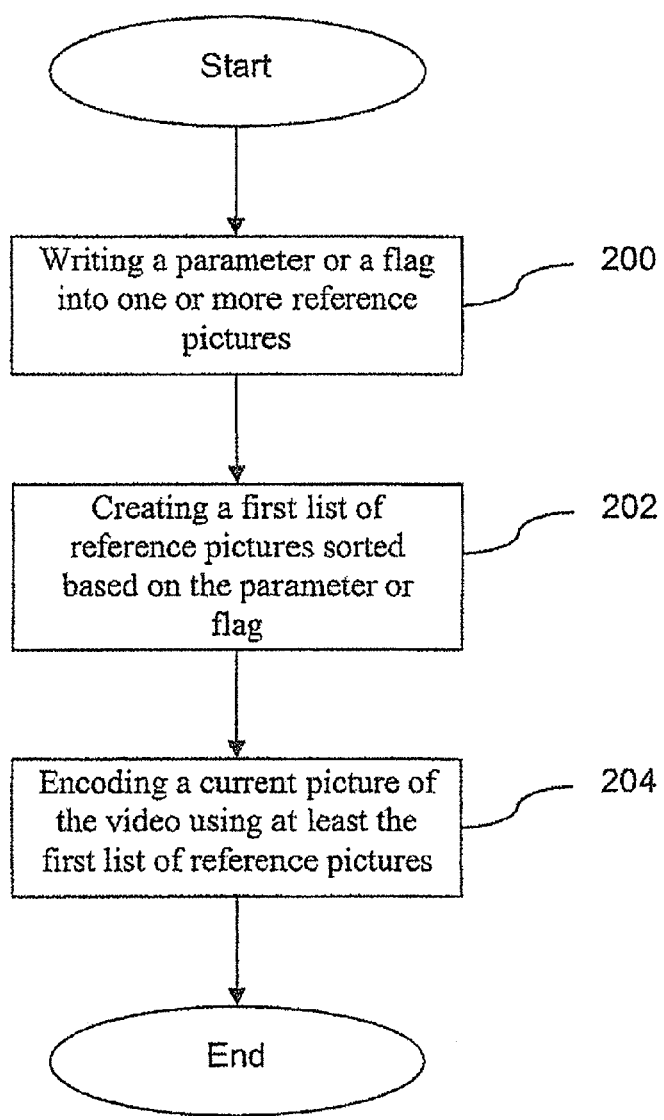

[Fig. 3]
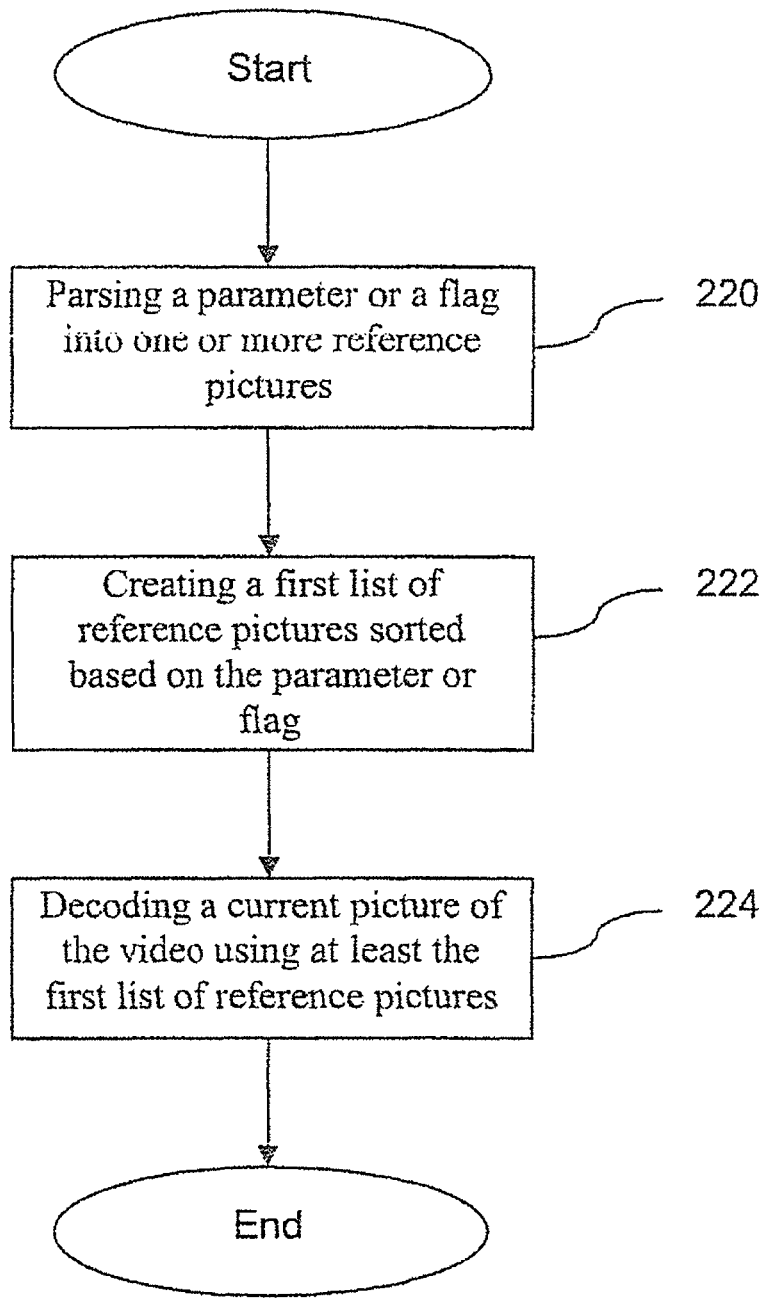

[Fig. 4]
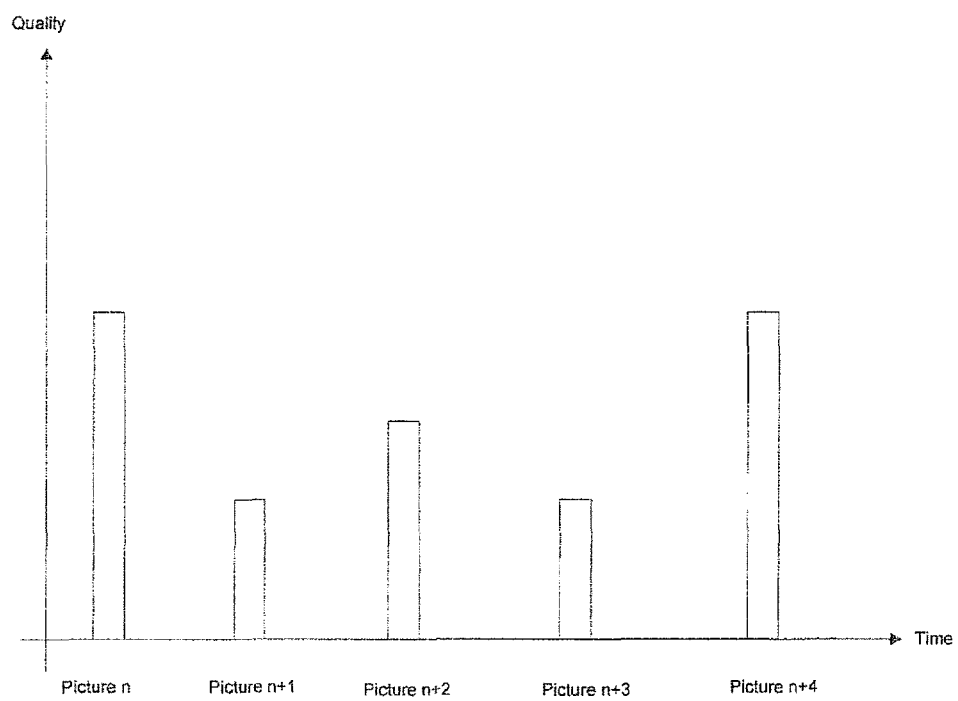

[Fig. 5]
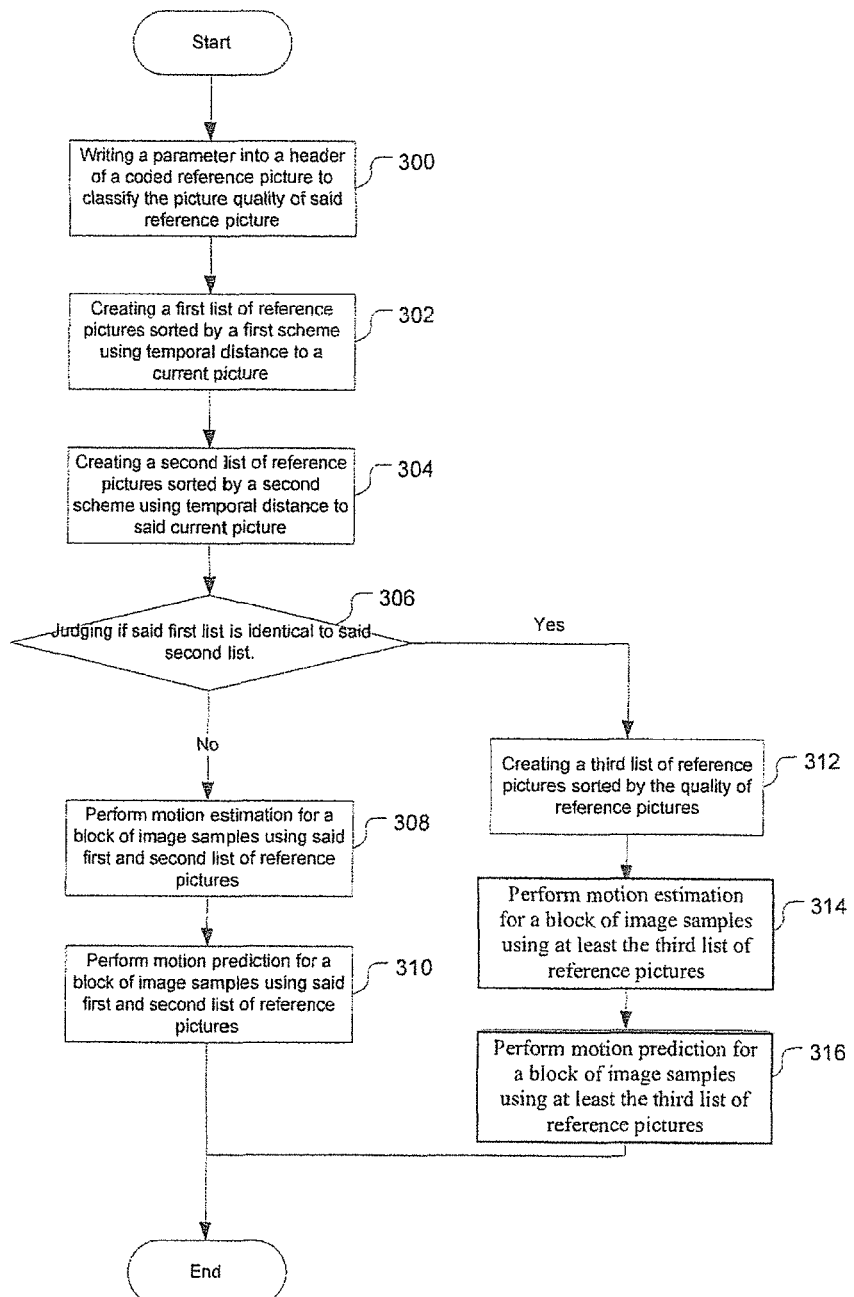

[Fig. 6]
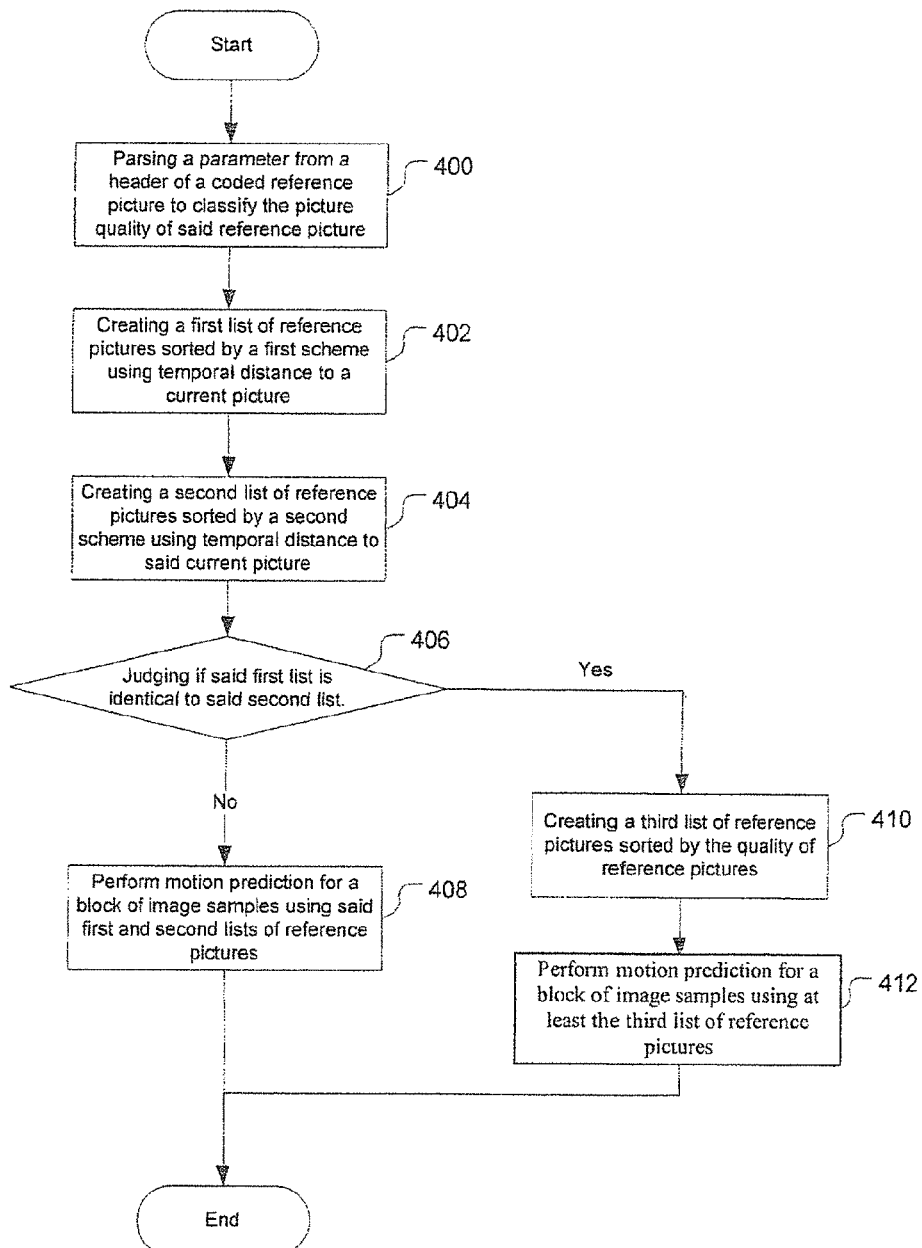

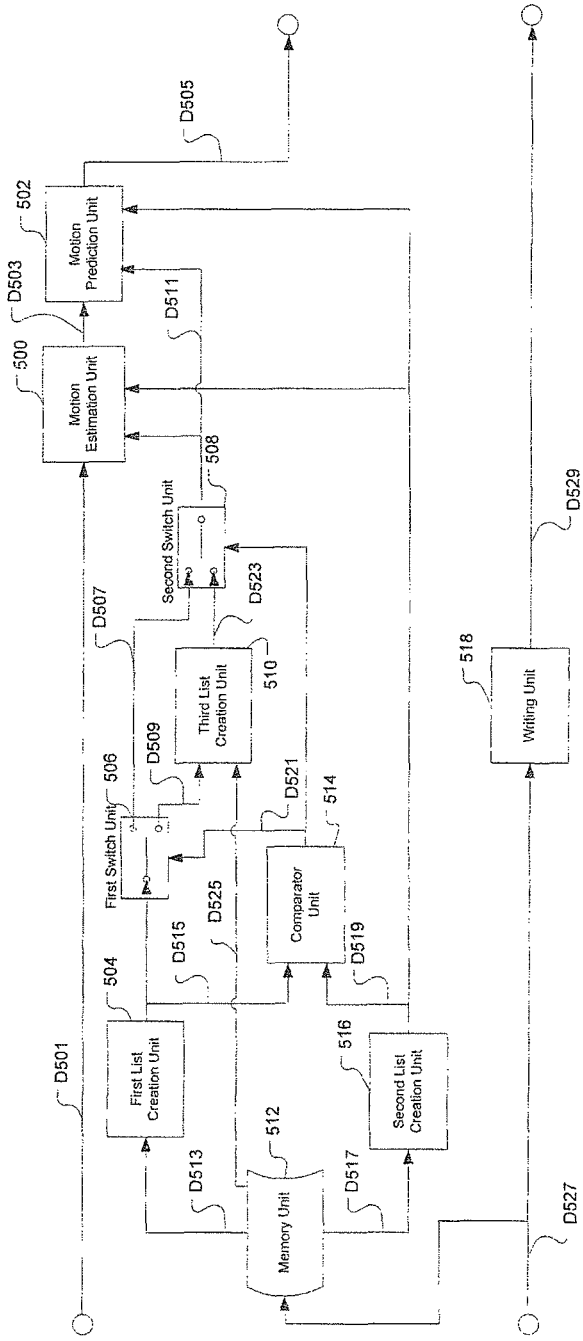
[Fig. 7]

[Fig. 8]
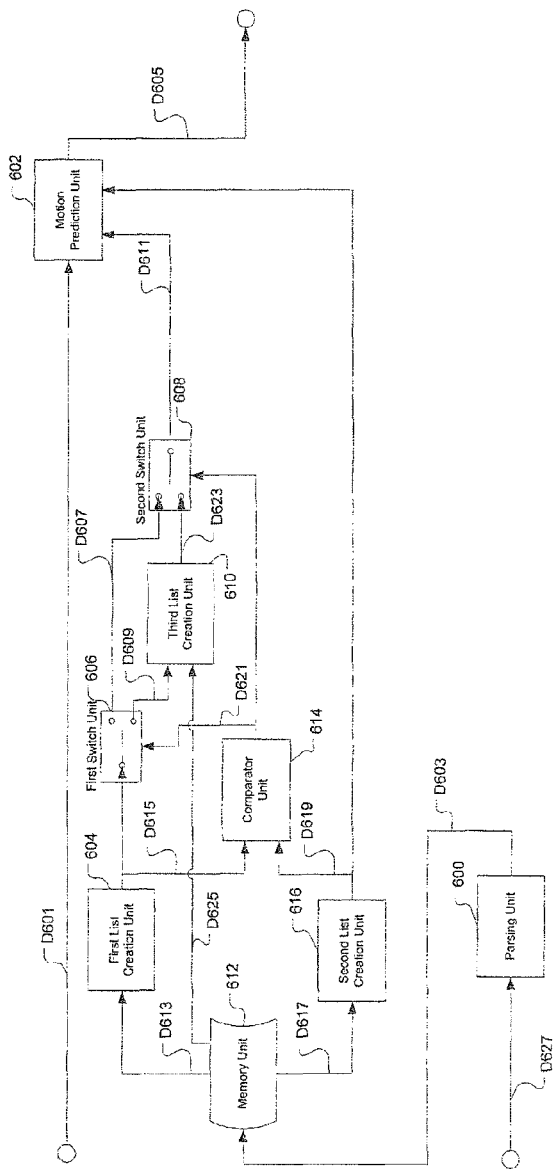
[Fig. 9]
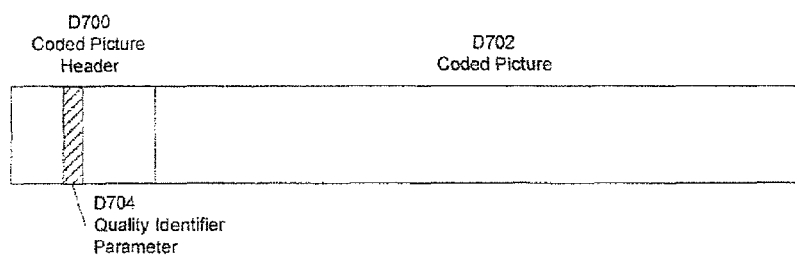

[Fig. 10A]
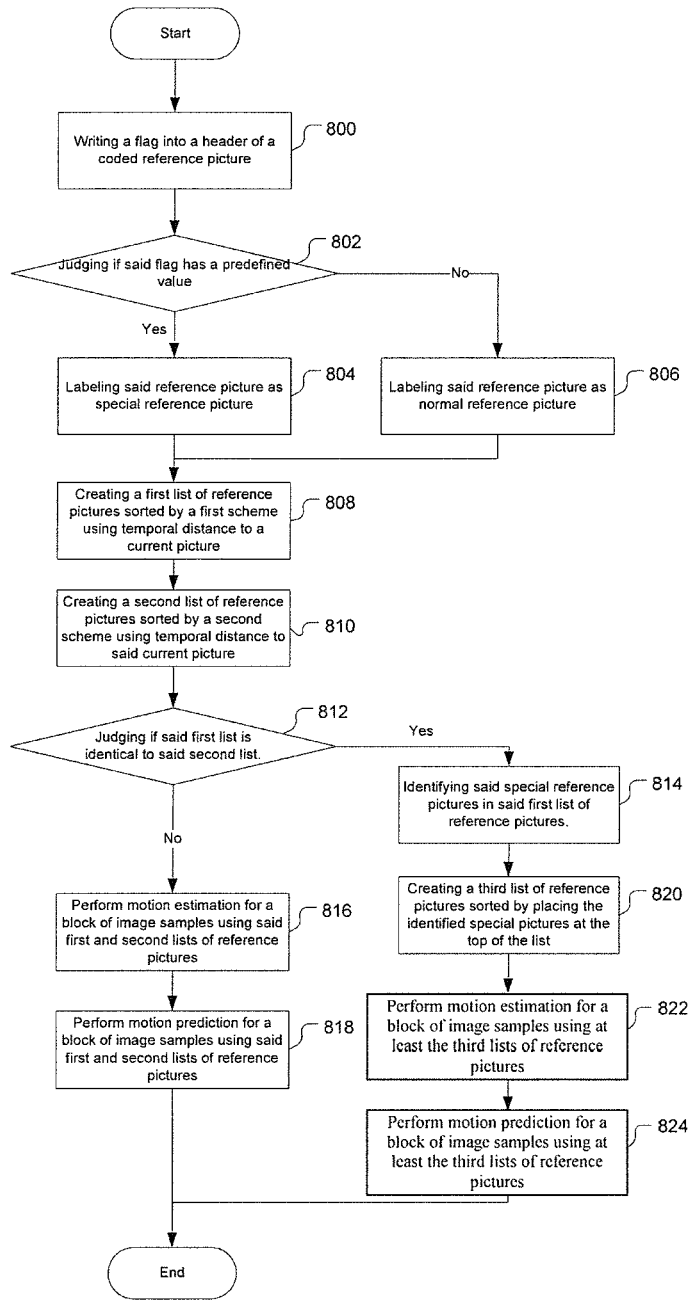

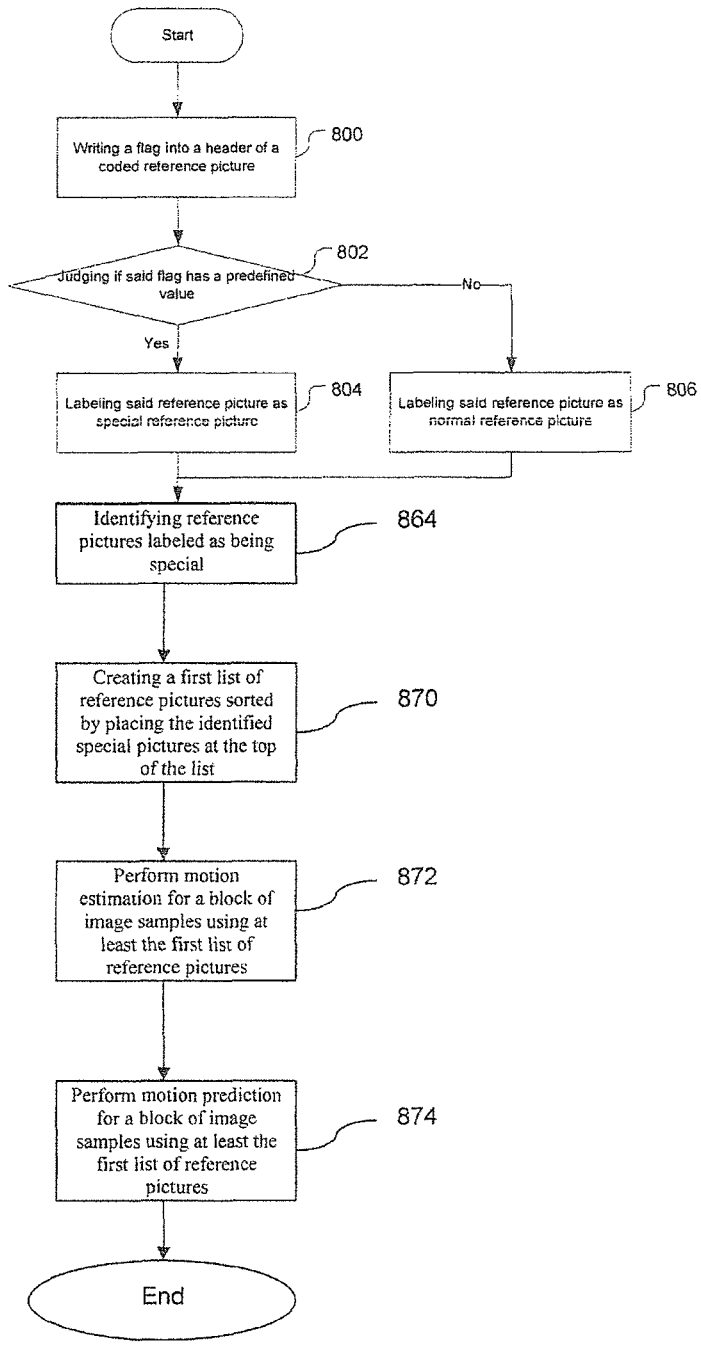
[Fig. 10B]

[Fig. 11A]
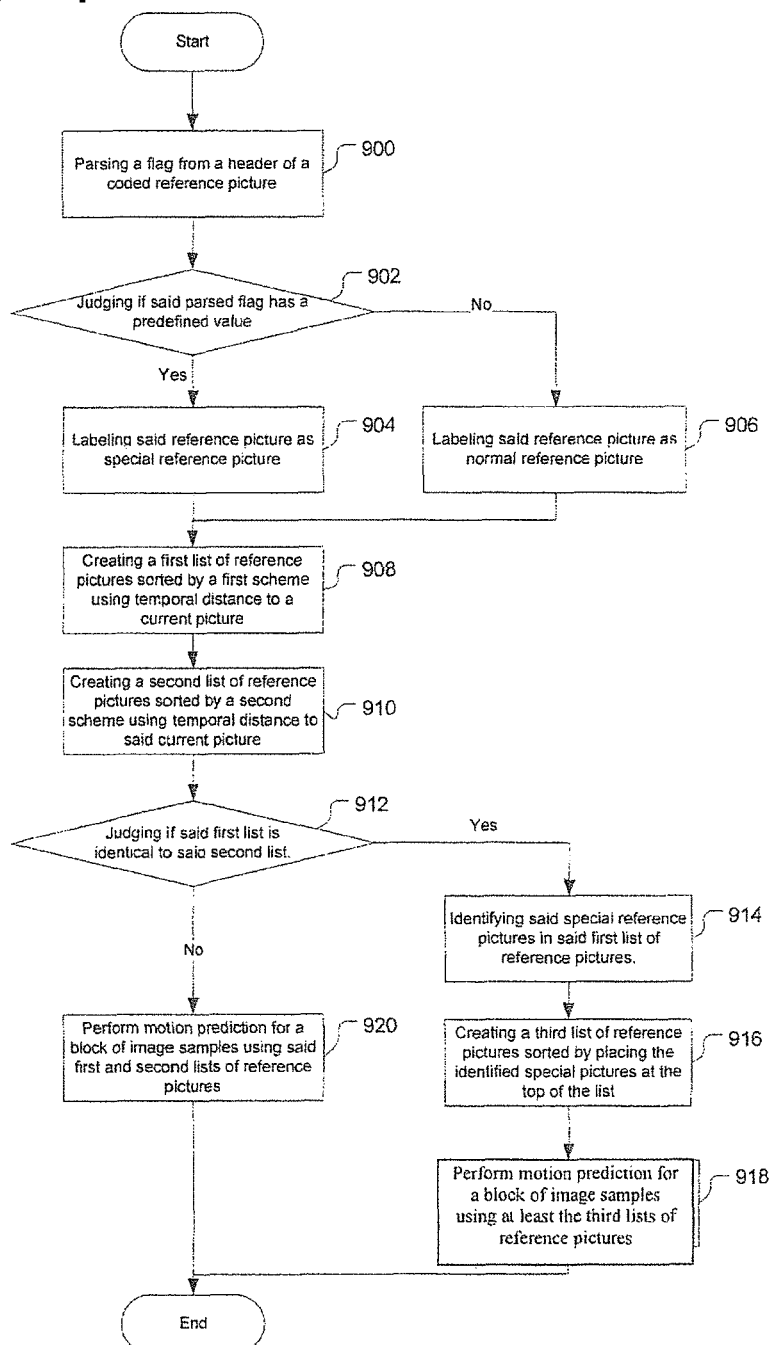

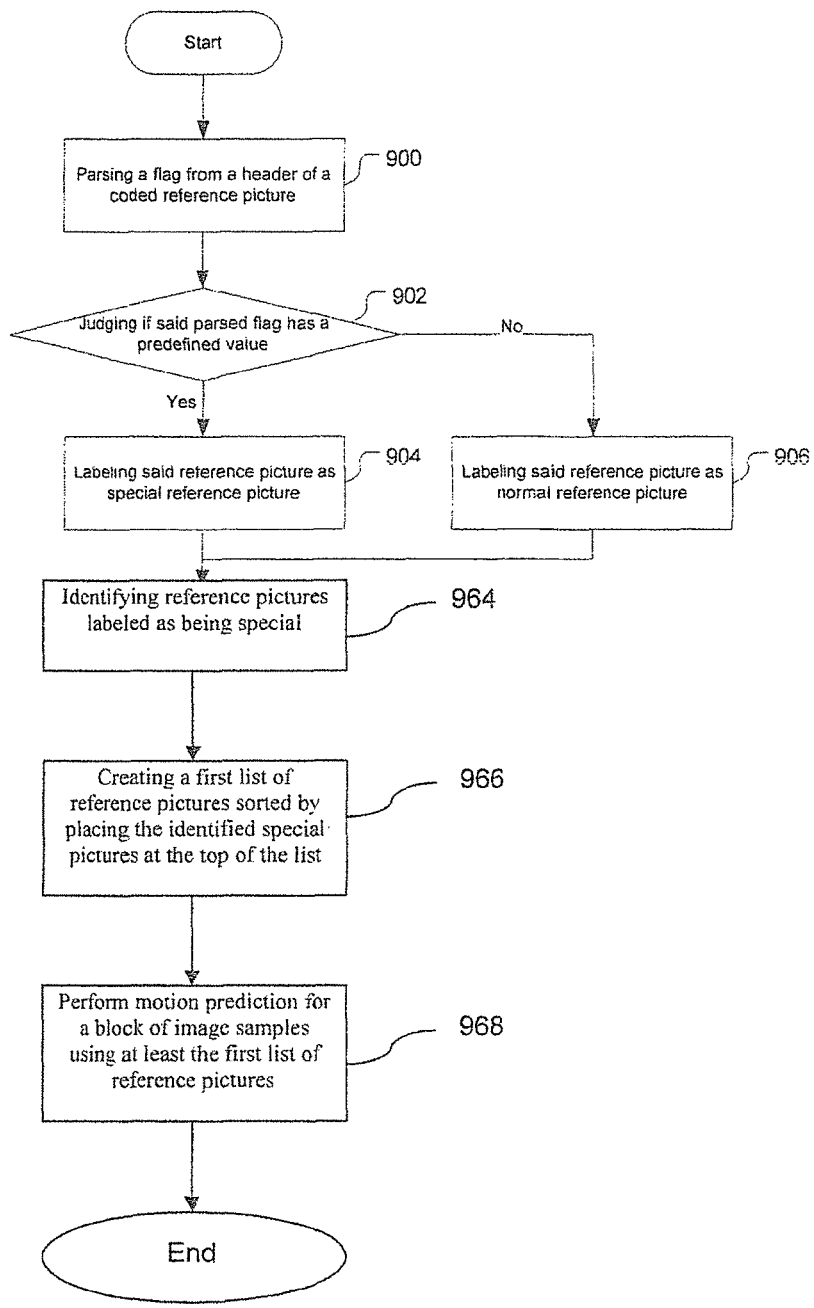
[Fig. 11B]

[Fig. 12]
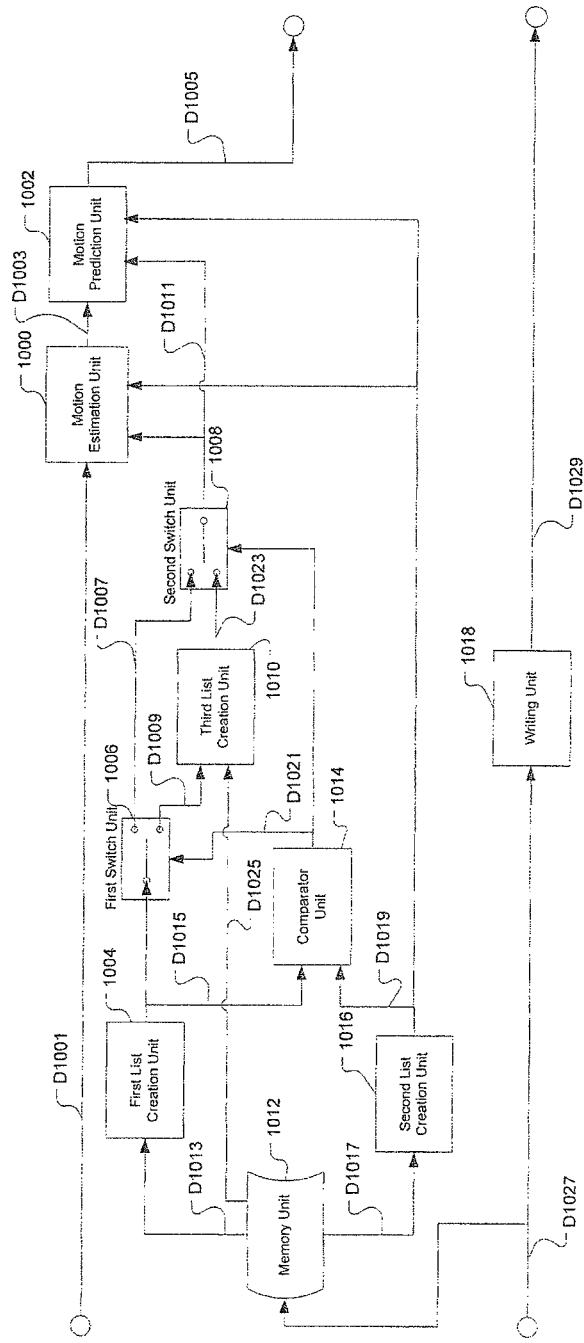

[Fig. 13]
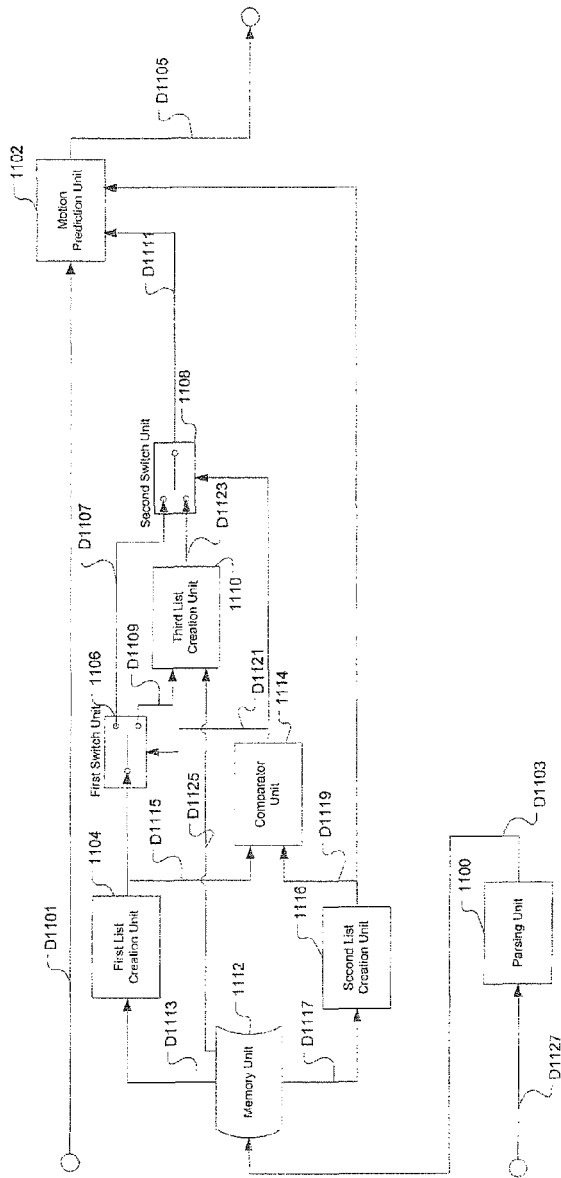
[Fig. 14]
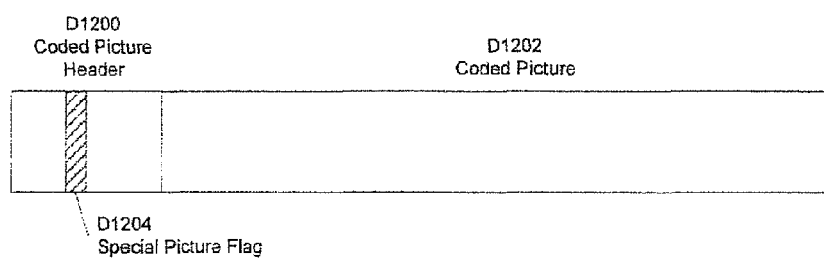

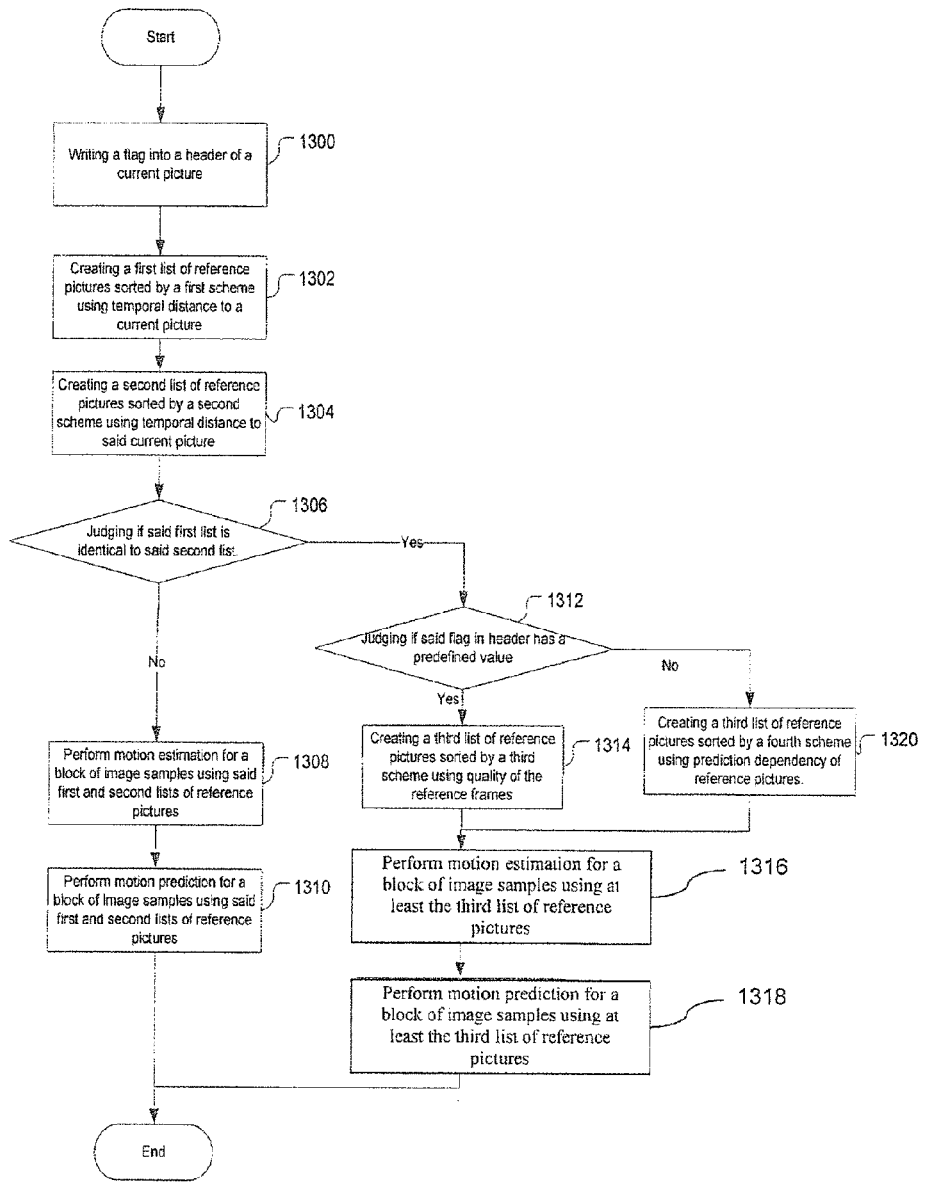
[Fig. 15A]

[Fig. 15B]
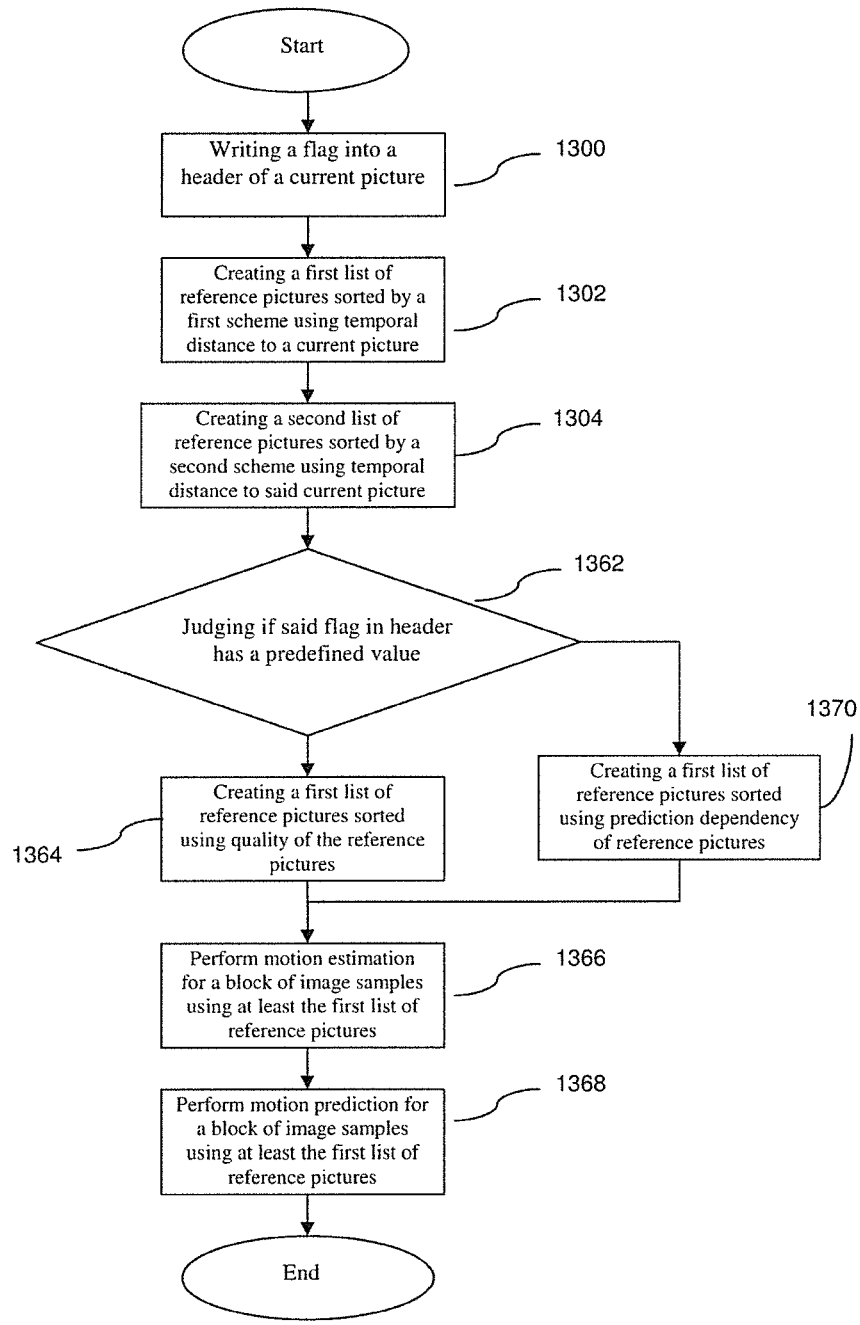

[Fig. 16A]
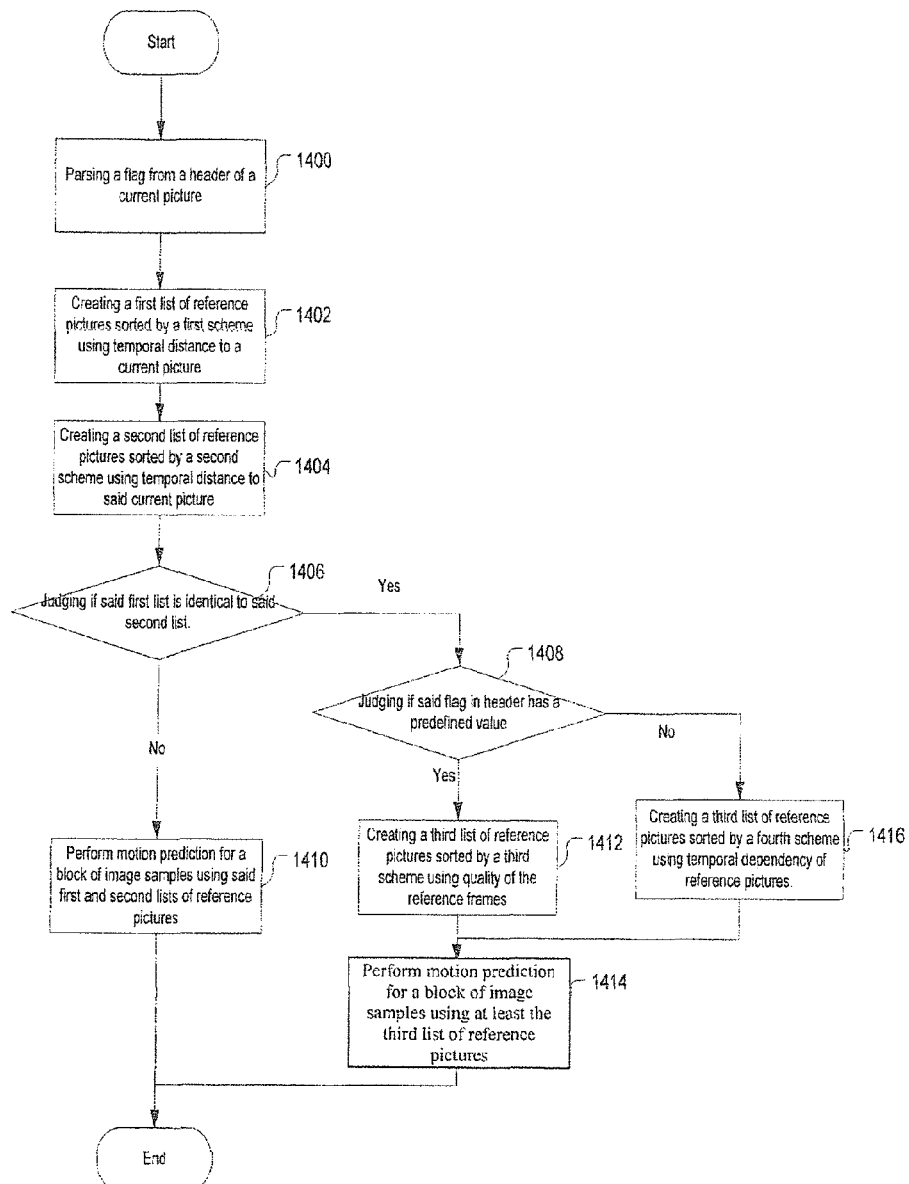

[Fig. 16B]
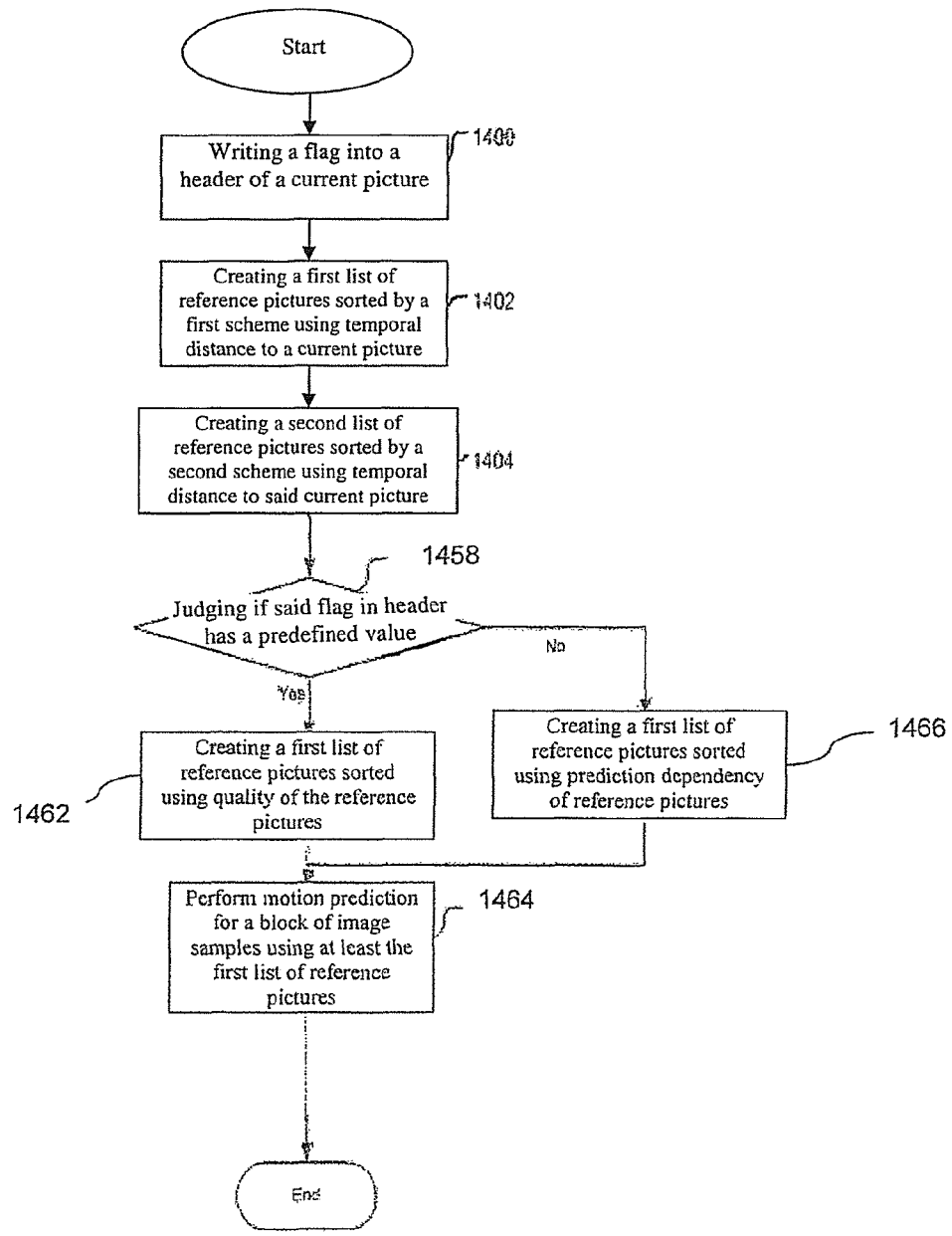

[Fig. 17]
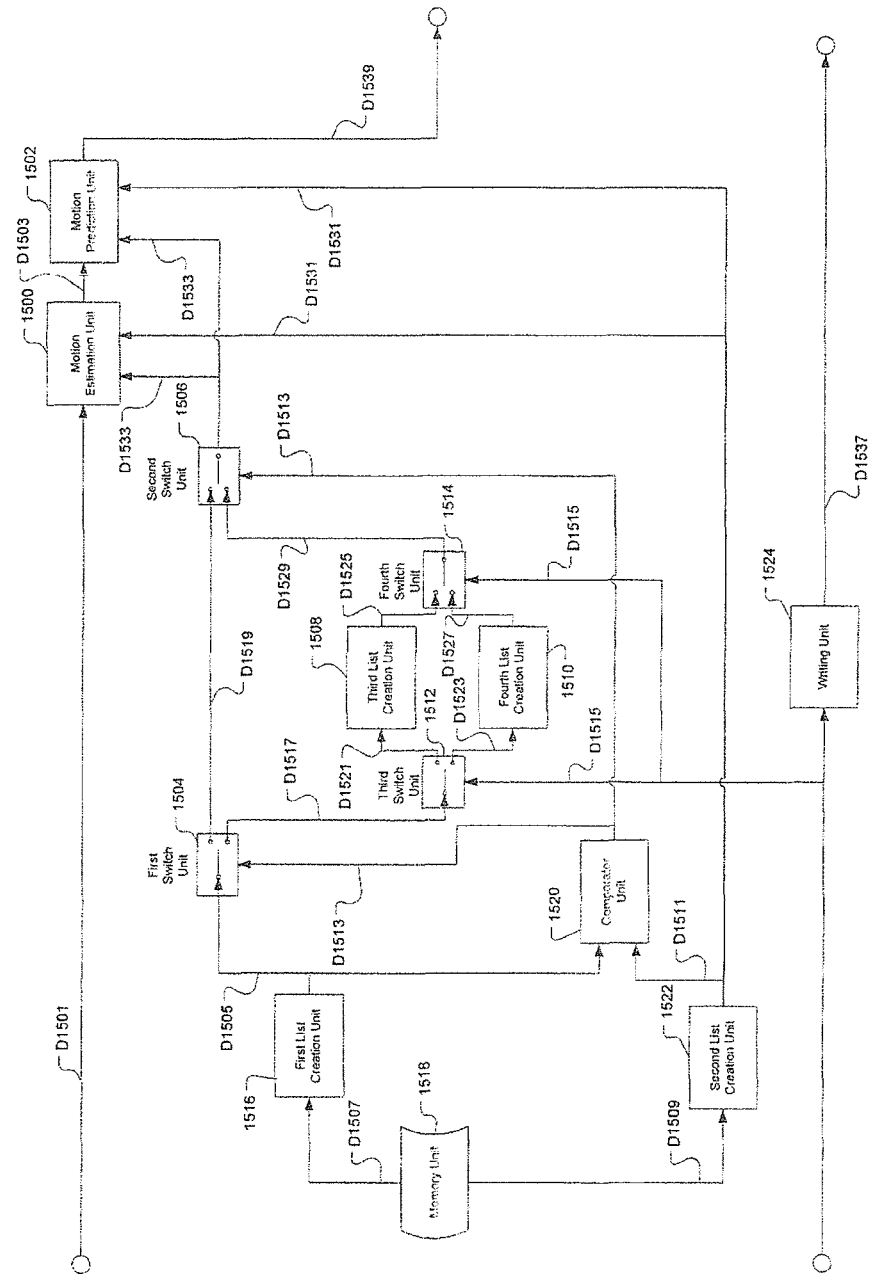

[Fig. 18]
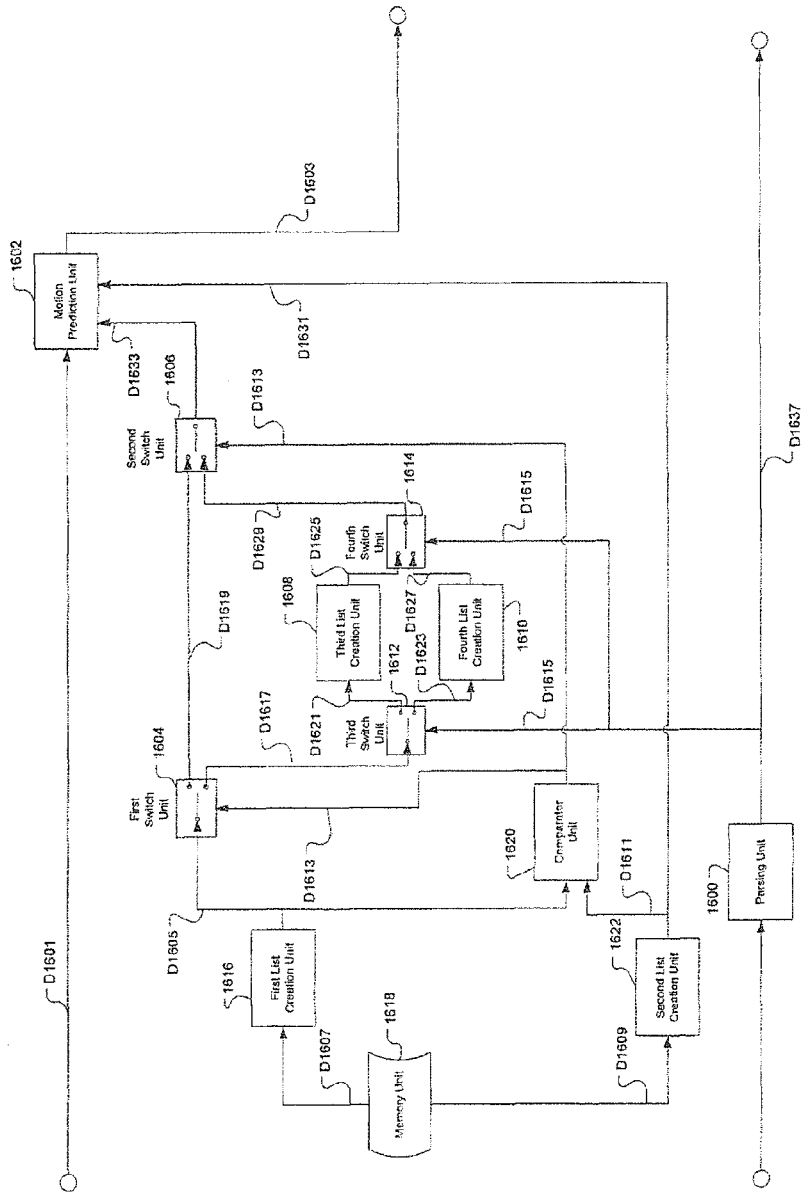
[Fig. 19]
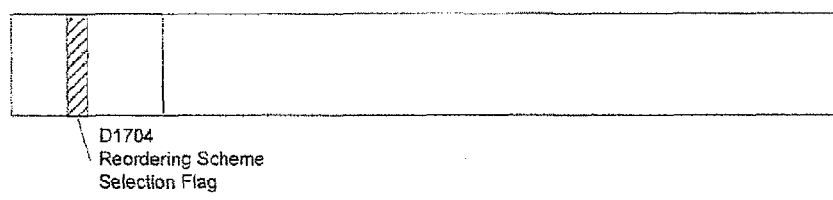

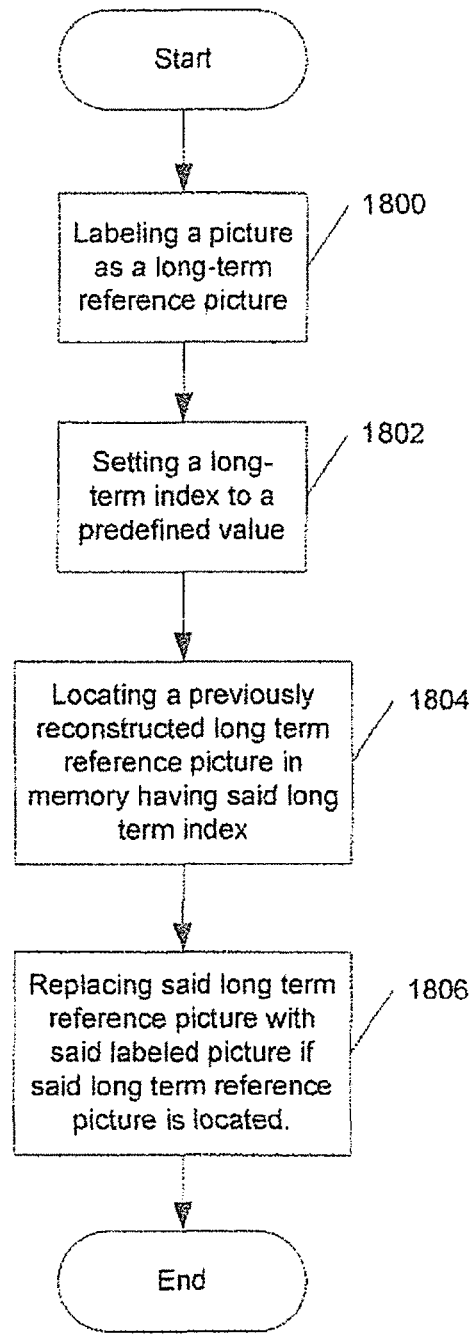
[Fig. 20]

[Fig. 21]
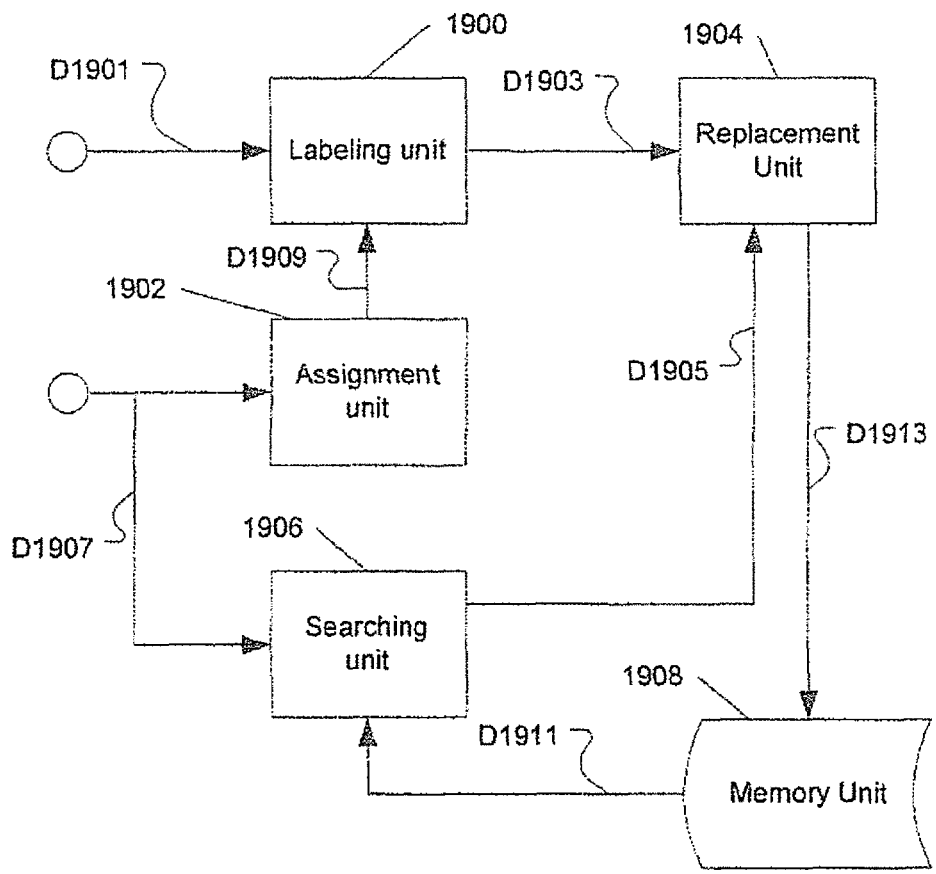

[Fig. 22]
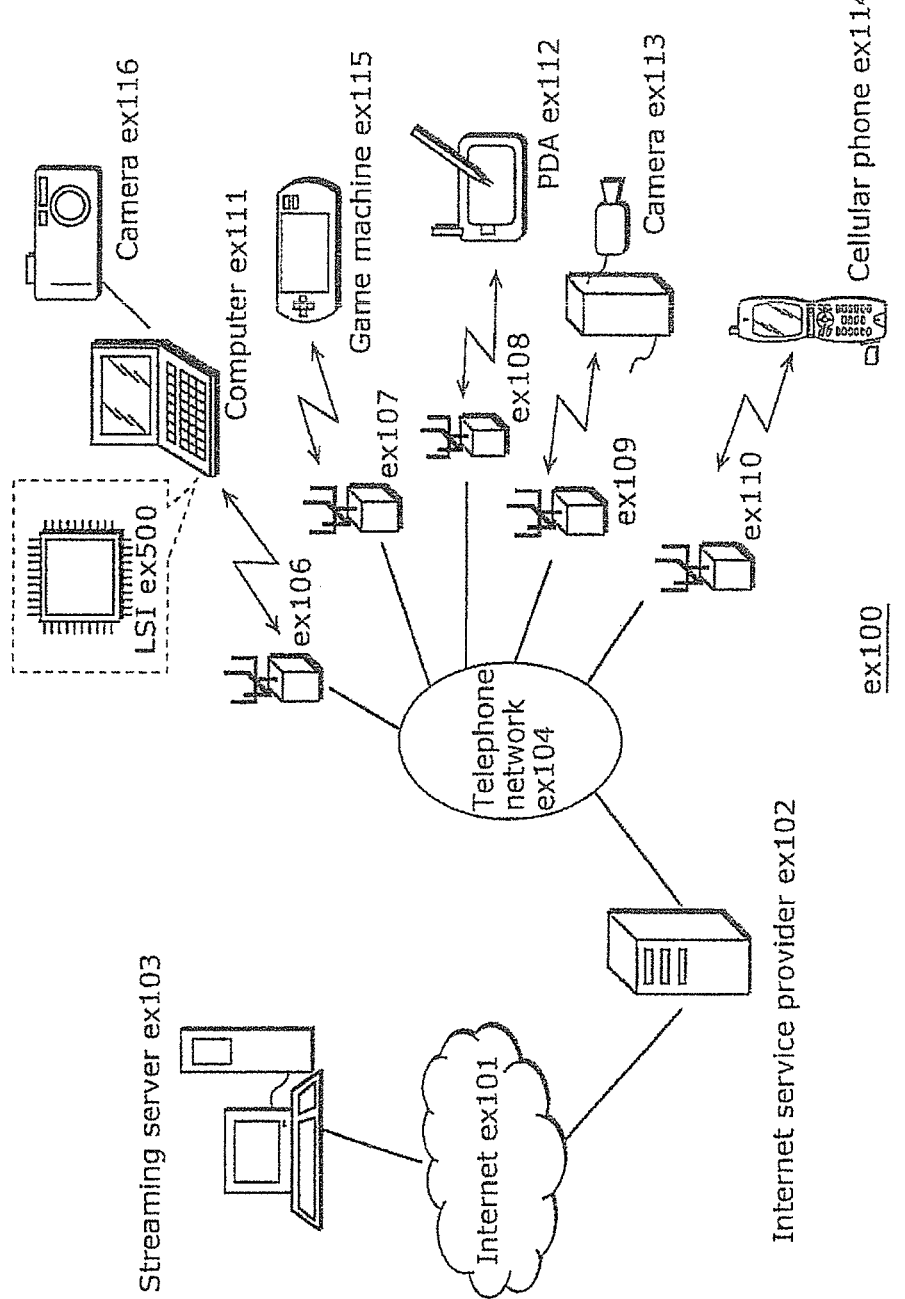

[Fig. 23]
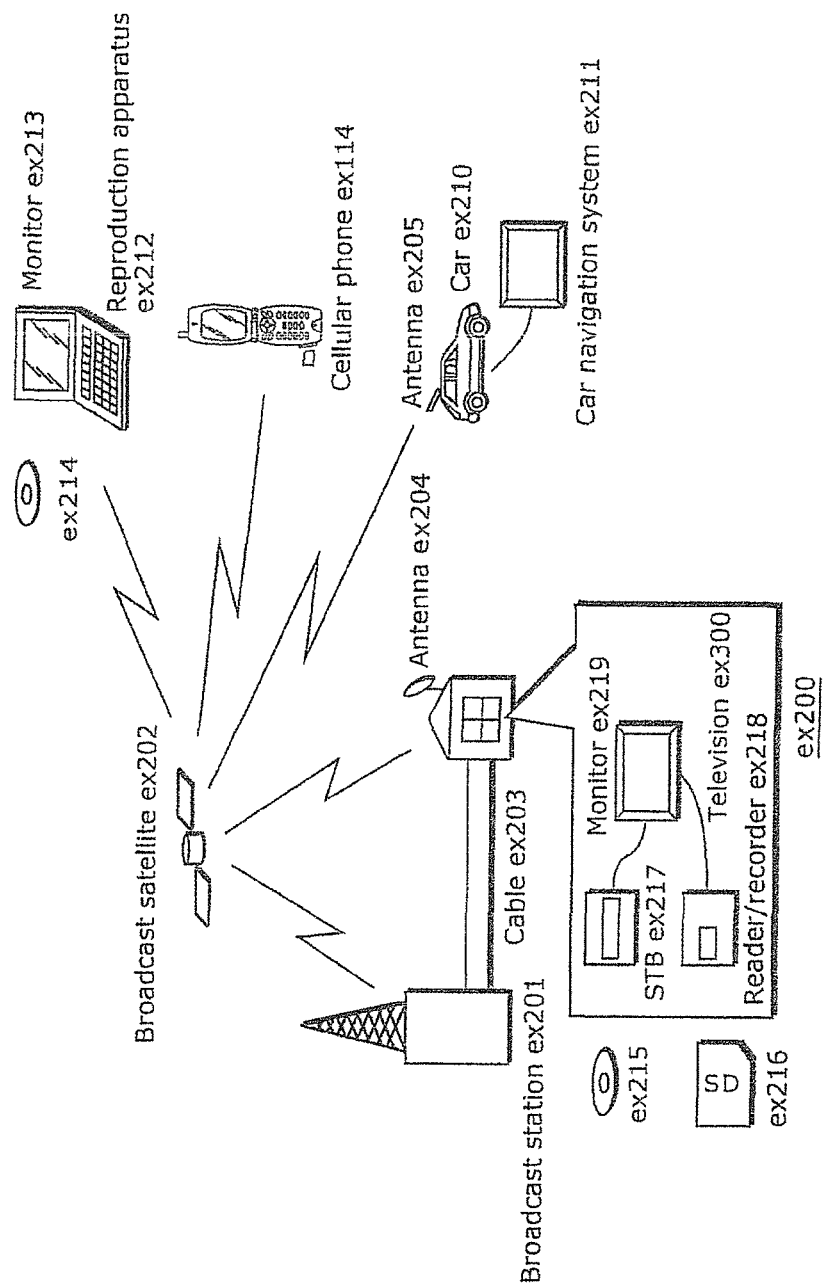

[Fig. 24]
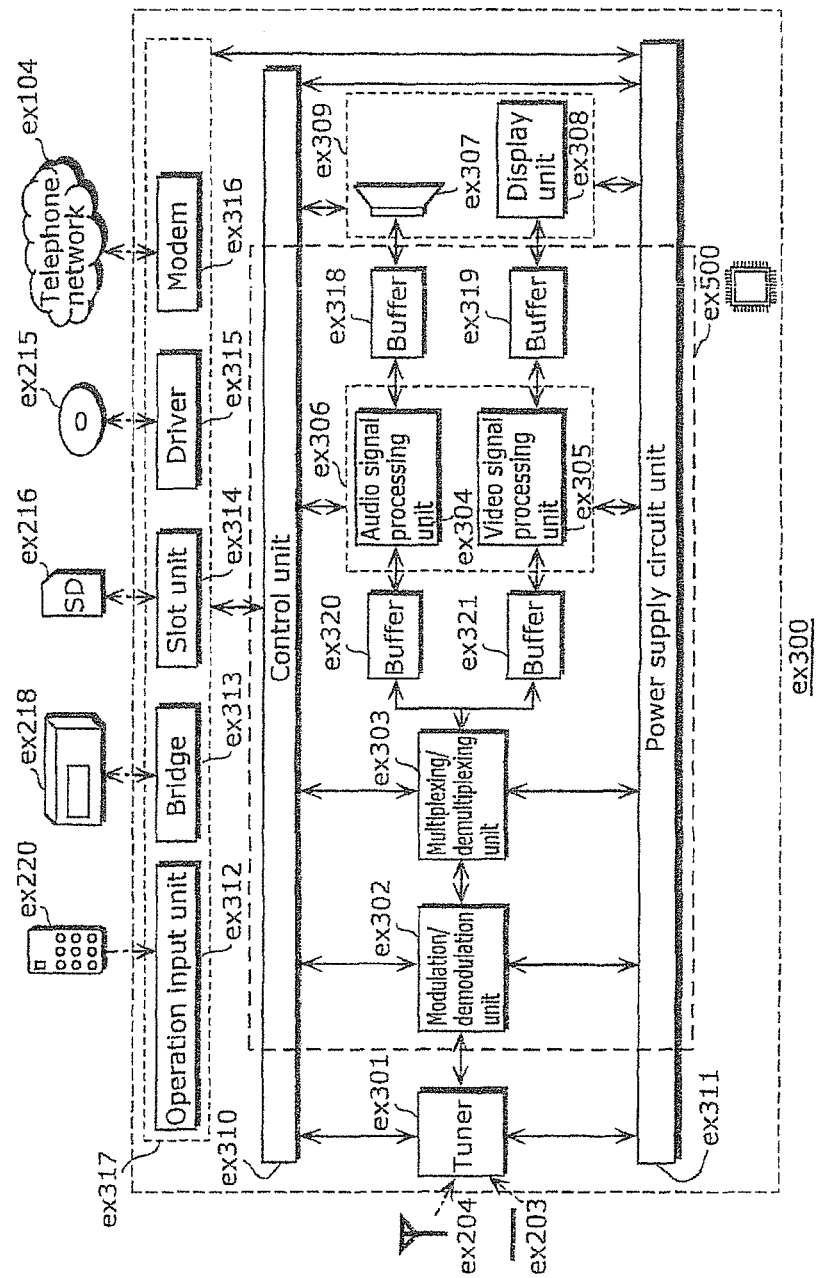

[Fig. 25]
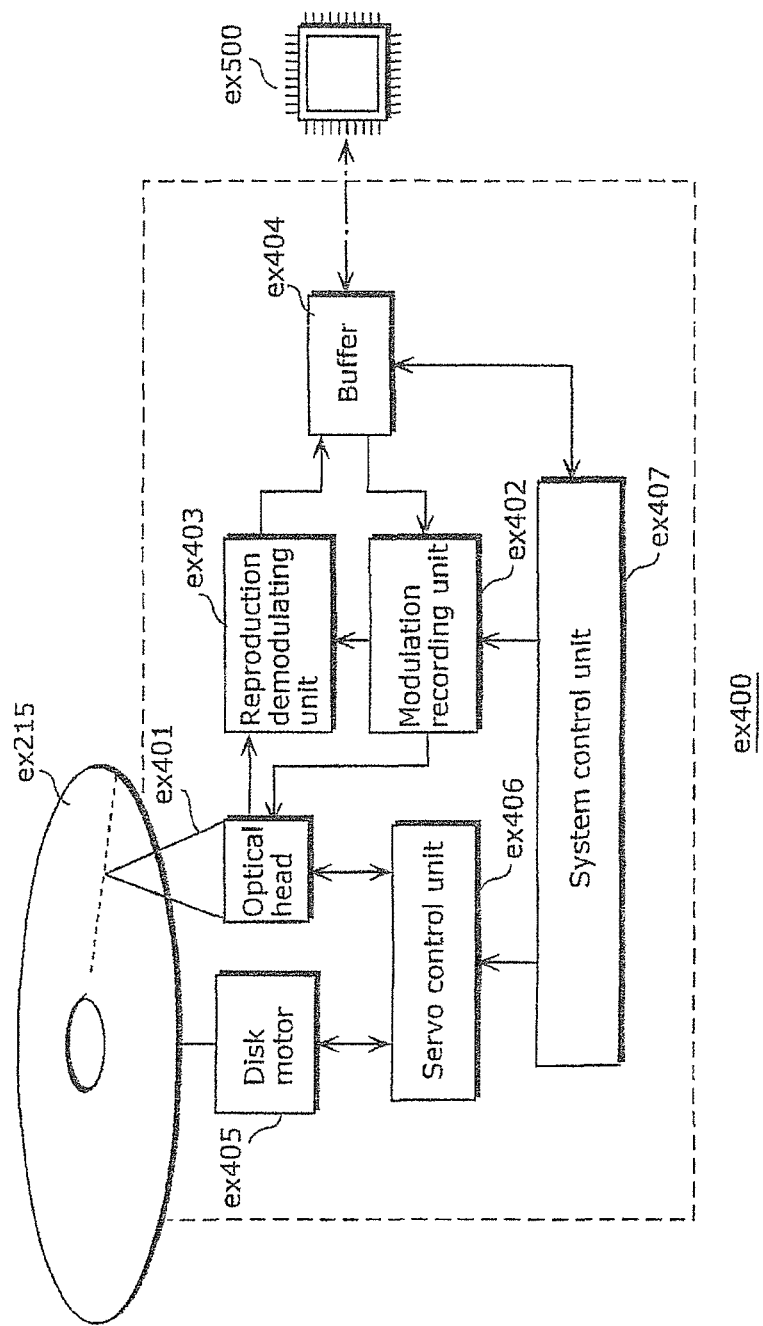

[Fig. 26]
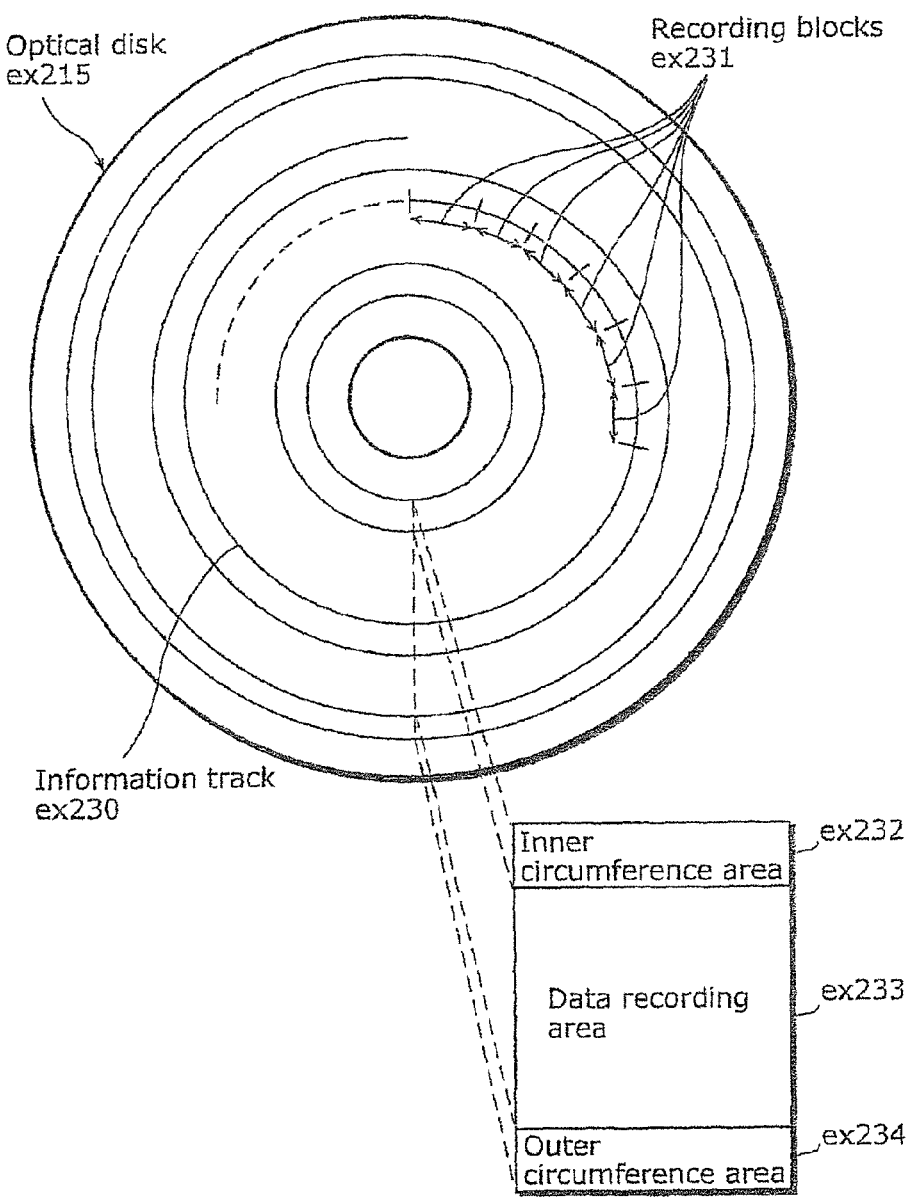

[Fig. 27A]
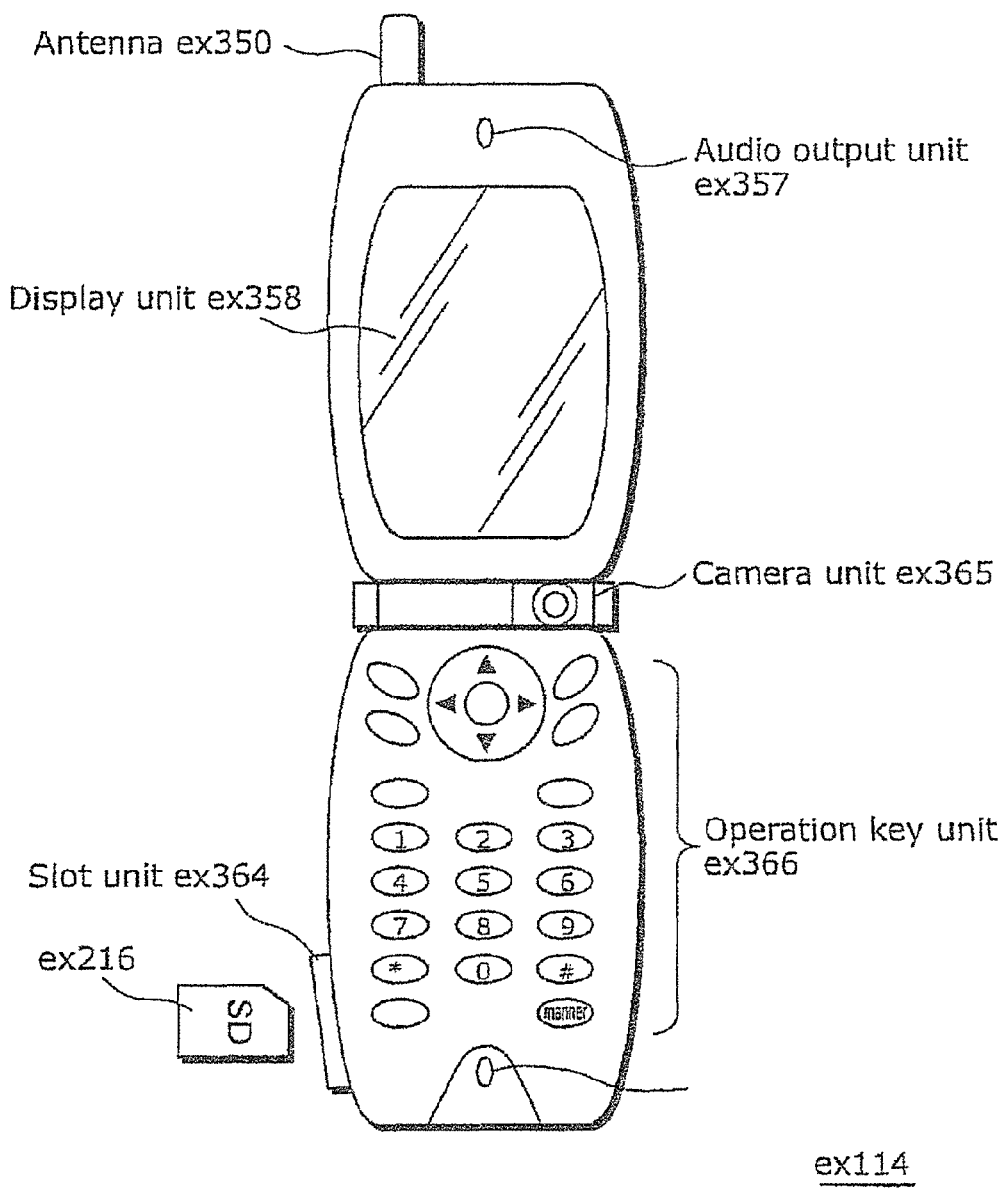

[Fig. 27B]
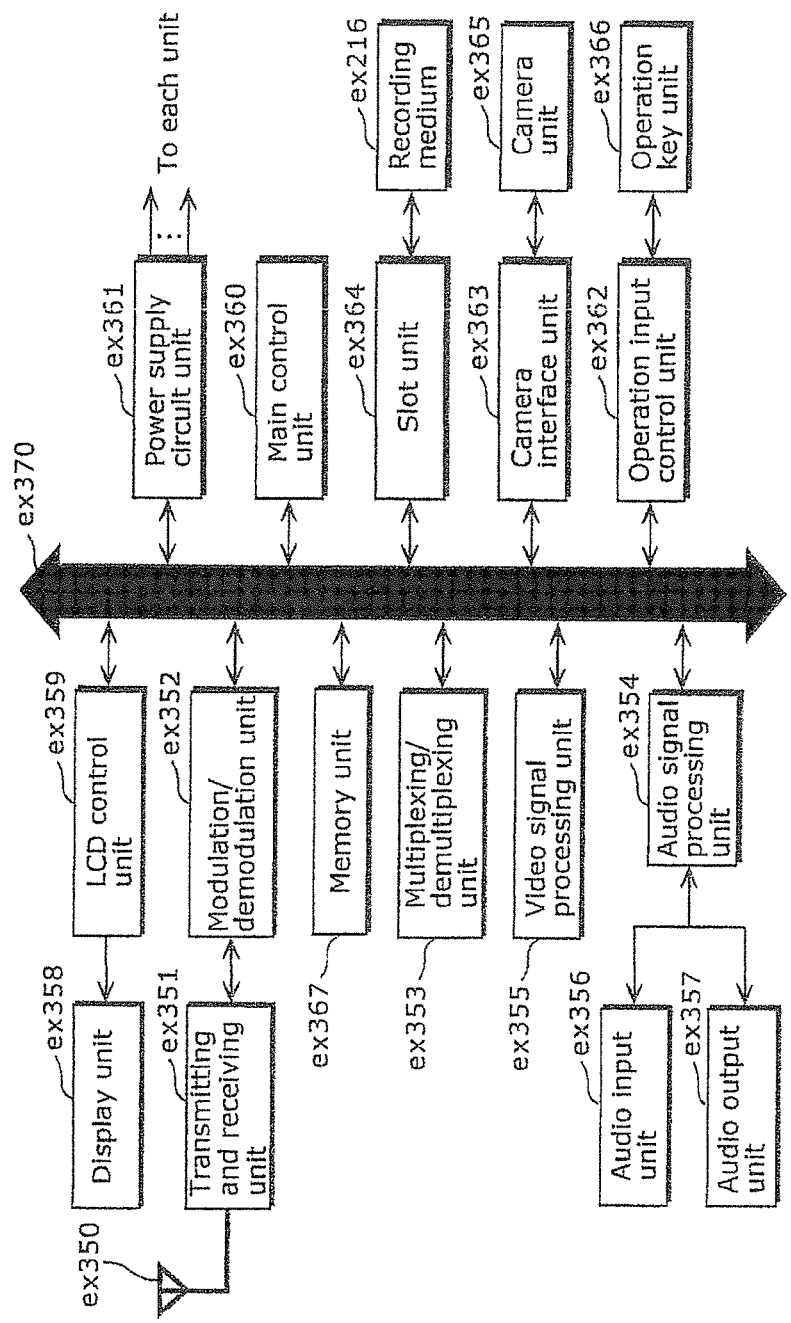

[Fig. 28]

Video stream (PID=0x1011 Primary video)
Audio stream (PID=0x1100)
Audio stream (PID=0x1101)
Presentation graphics stream (PID=0x1200)
Presentation graphics stream (PID=0x1201)
Interactive graphics stream (PID=0x1400)
Video stream (PID=0x1B00 Secondary video)
Video stream (PID=0x1B01 Secondary video)

[Fig. 29]
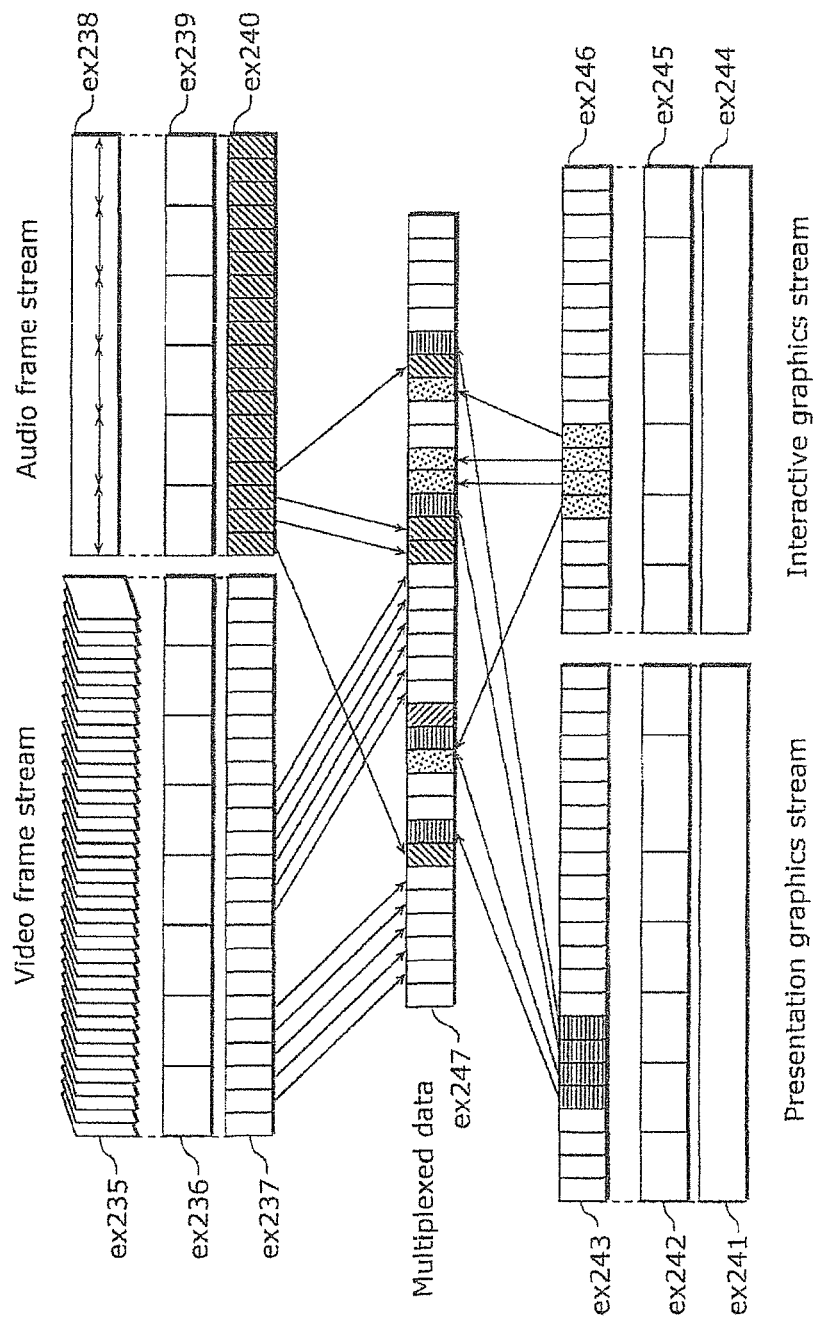

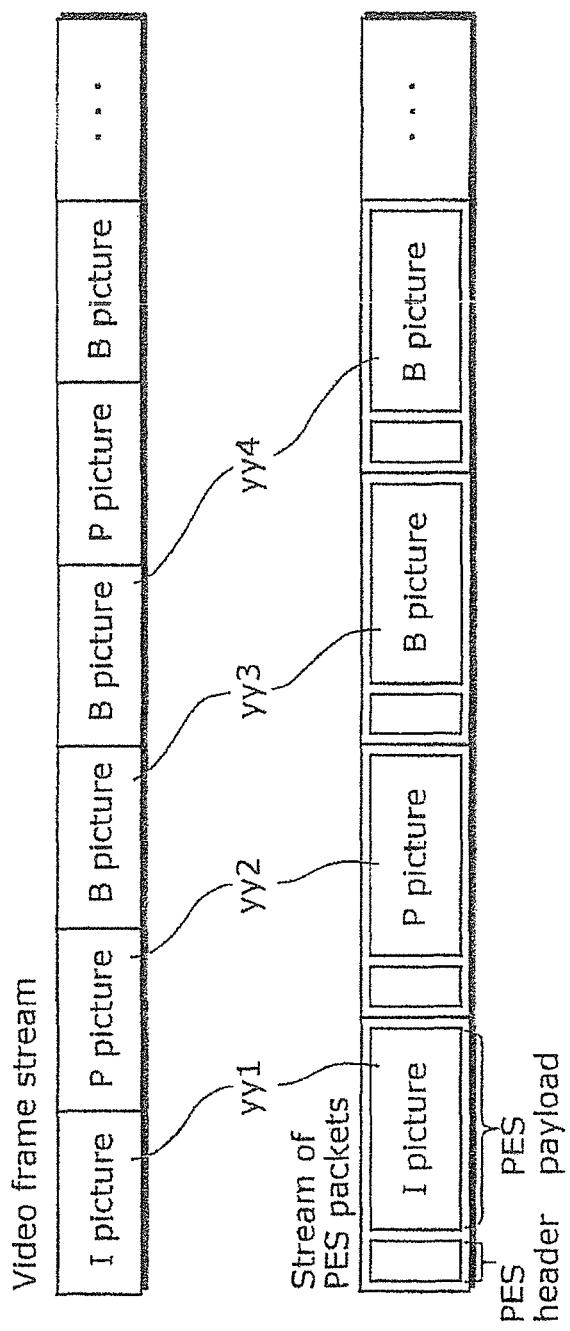
[Fig. 30]

[Fig. 31]
Stream of TS packets
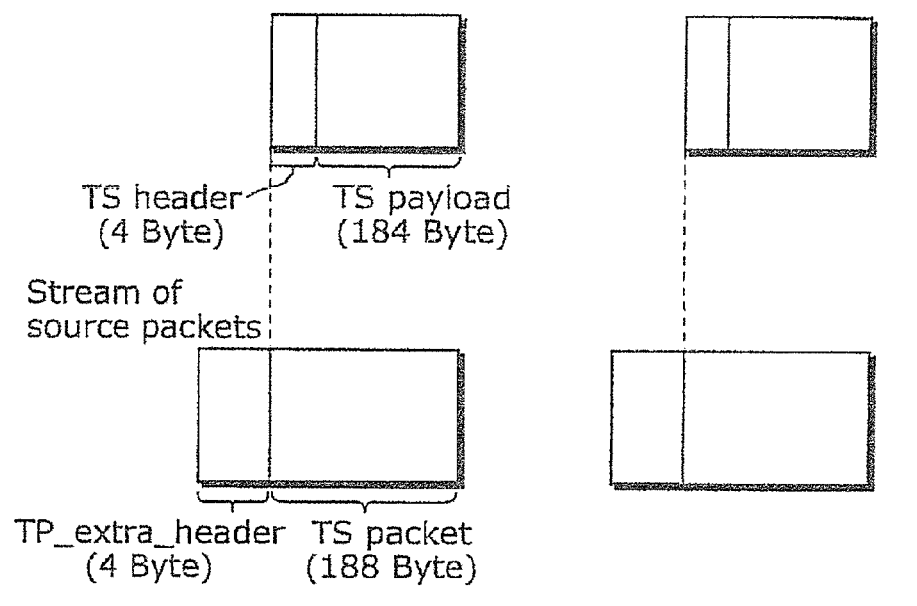
Multiplexed data
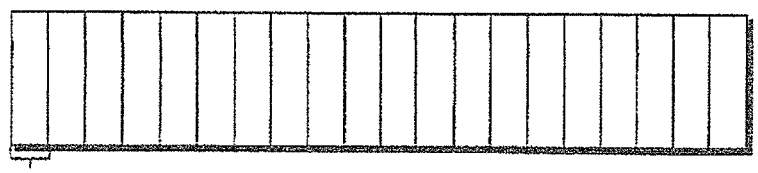
Source packet

[Fig. 32]
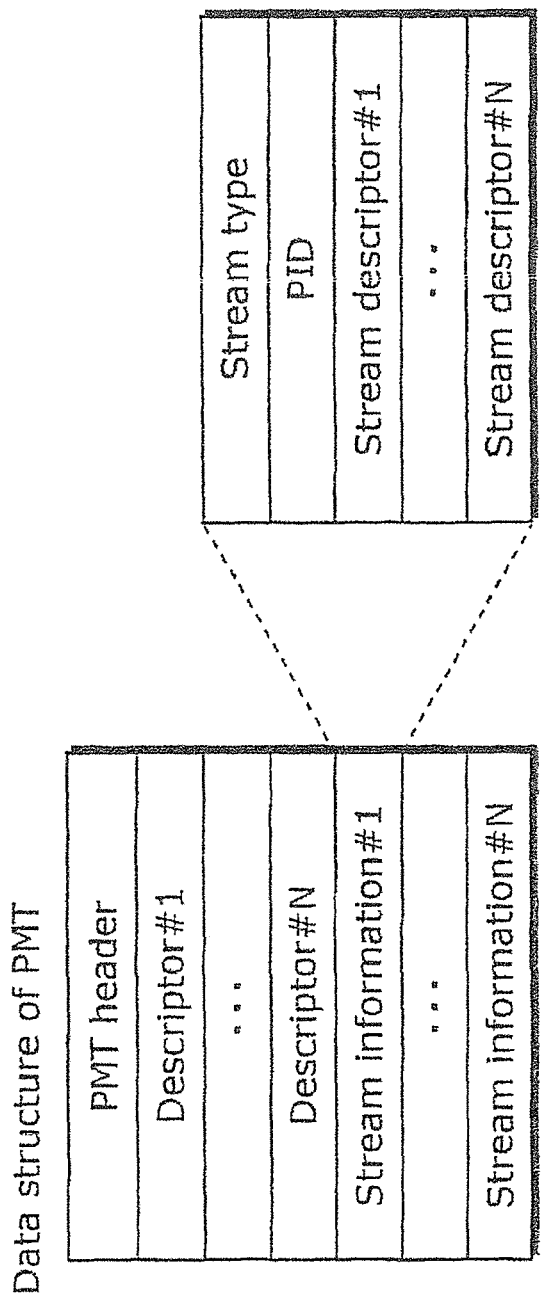

[Fig. 33]
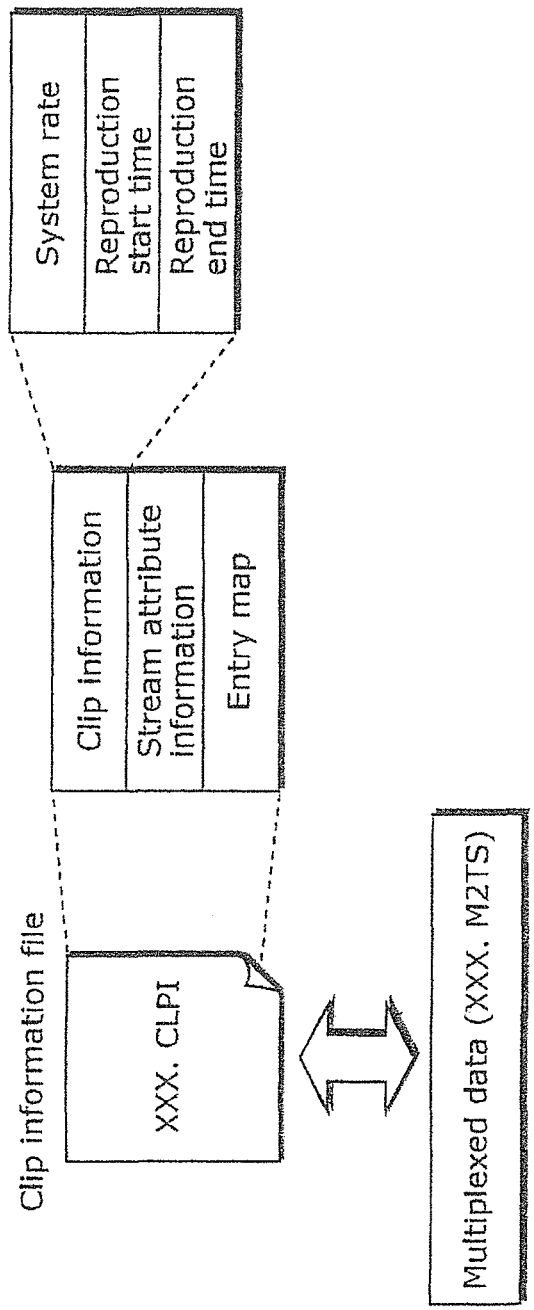

[Fig. 34]
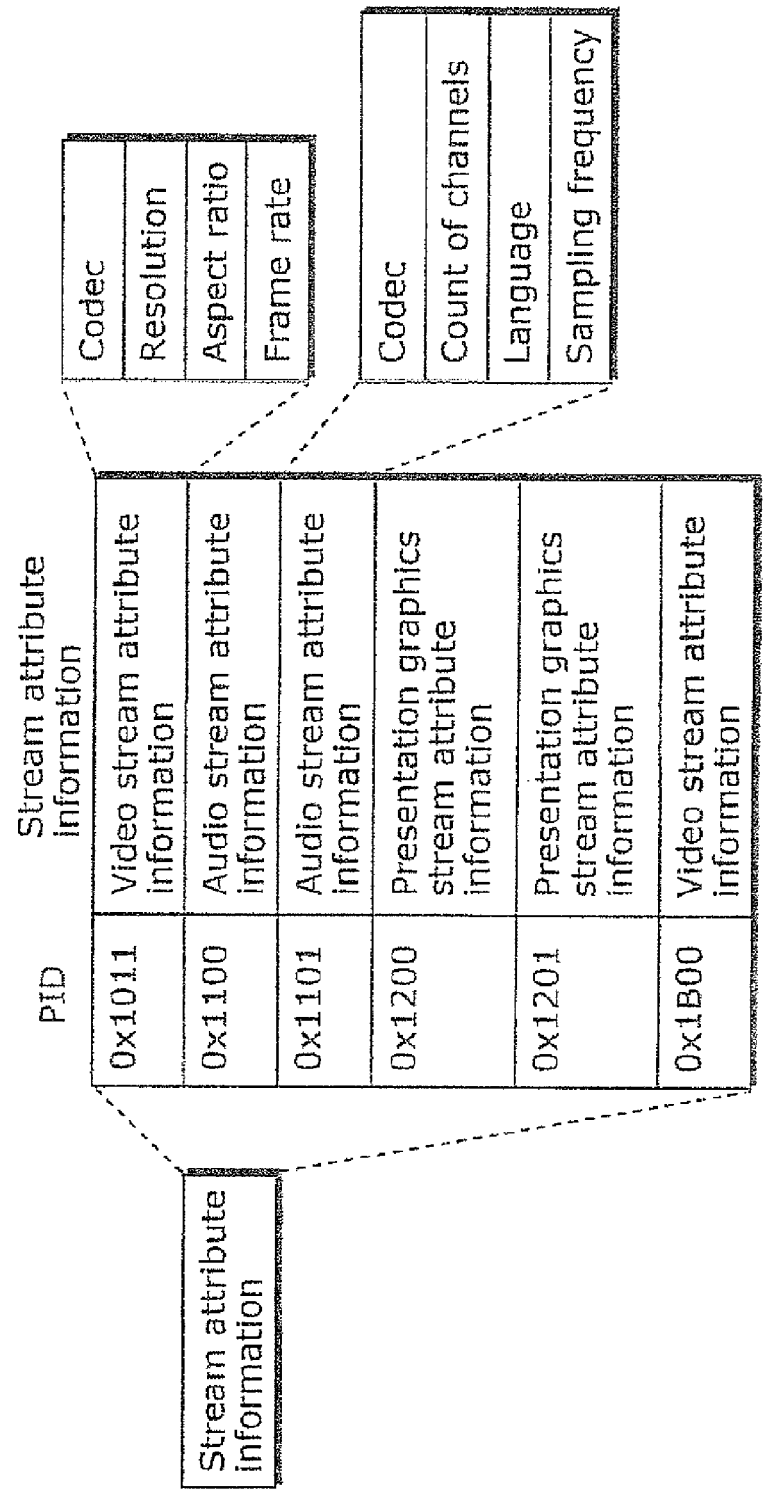

[Fig. 35]
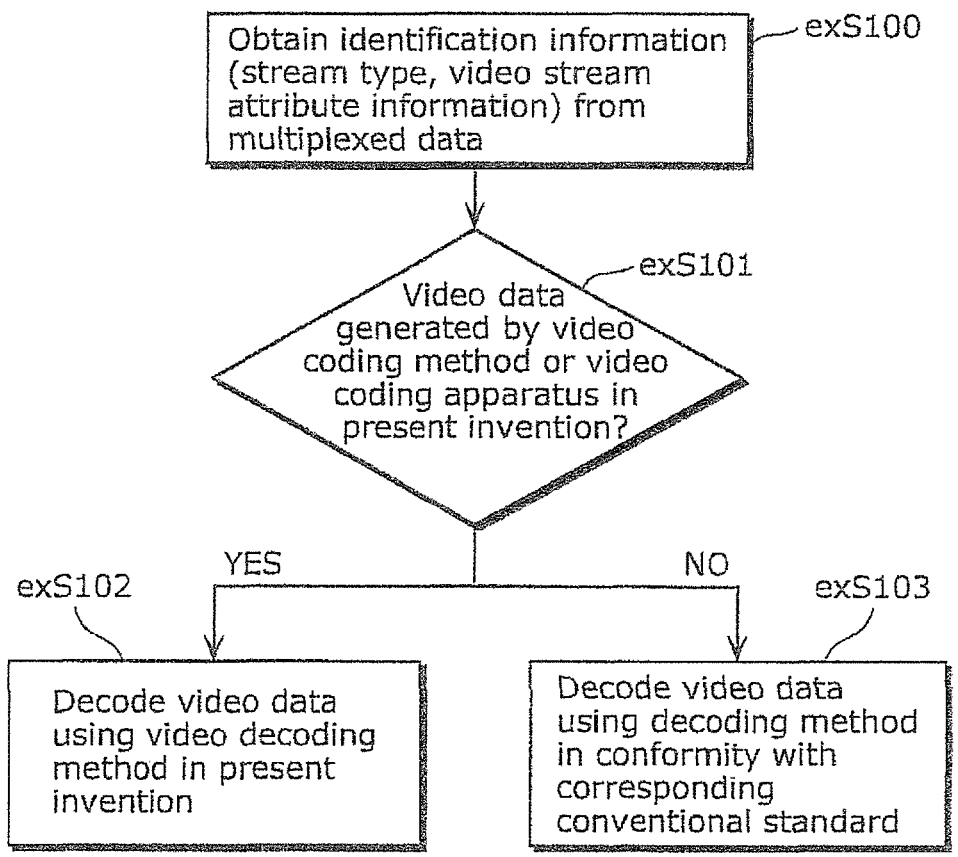

[Fig. 36]
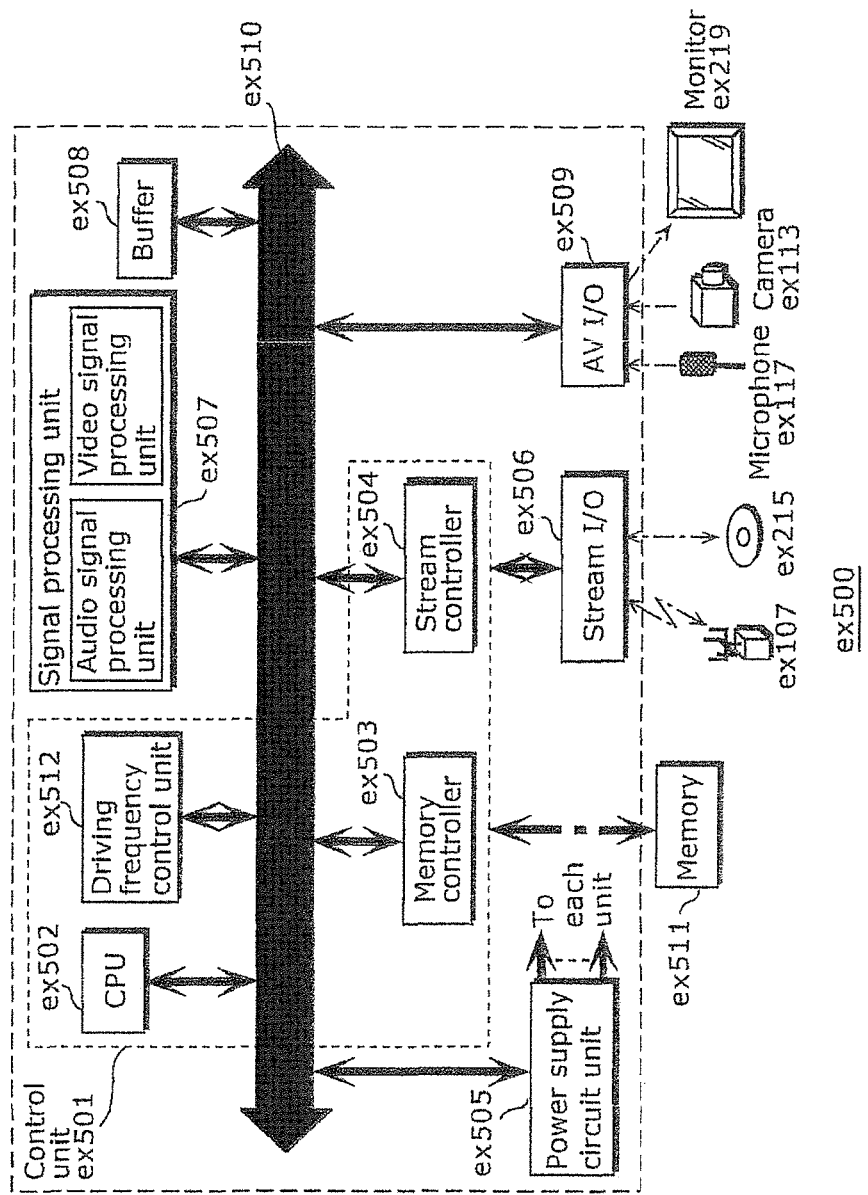

[Fig. 37]
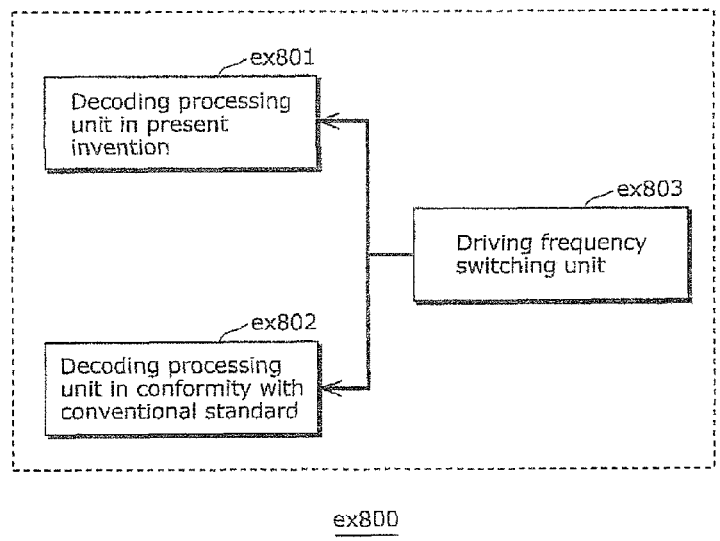
[Fig. 38]
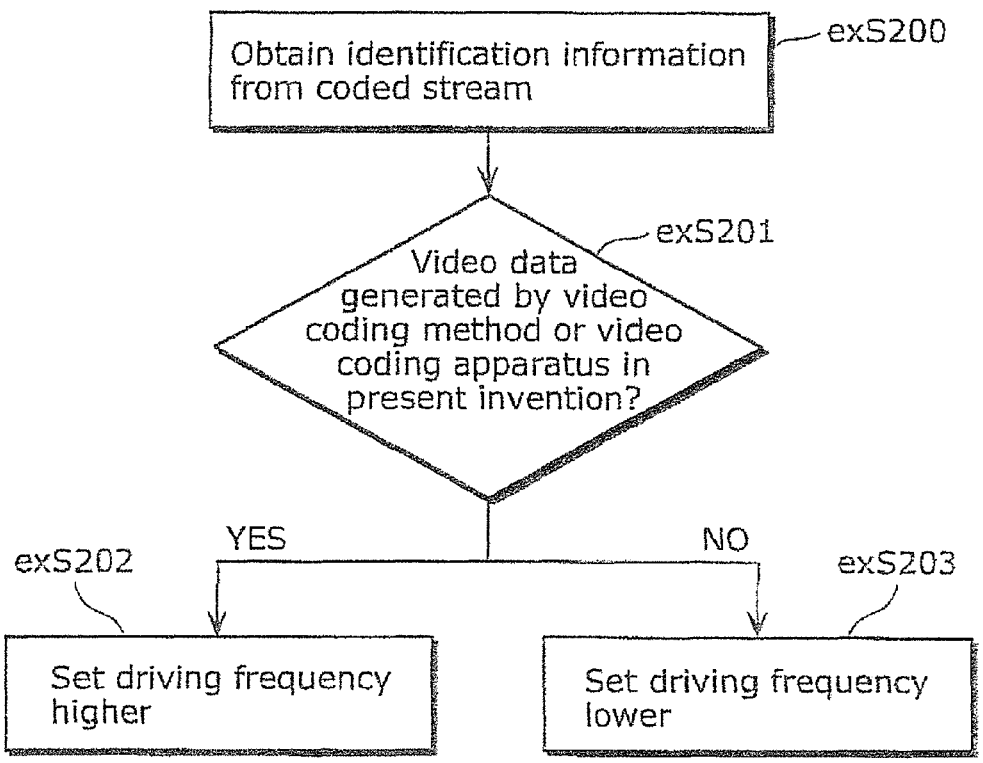

[Fig. 39]
| Corresponding standard | Driving frequency |
|---|---|
| MPEG4. AVC | 500MHz |
| MPEG2 | 350MHz |
| ... | ... |
[Fig. 40A]
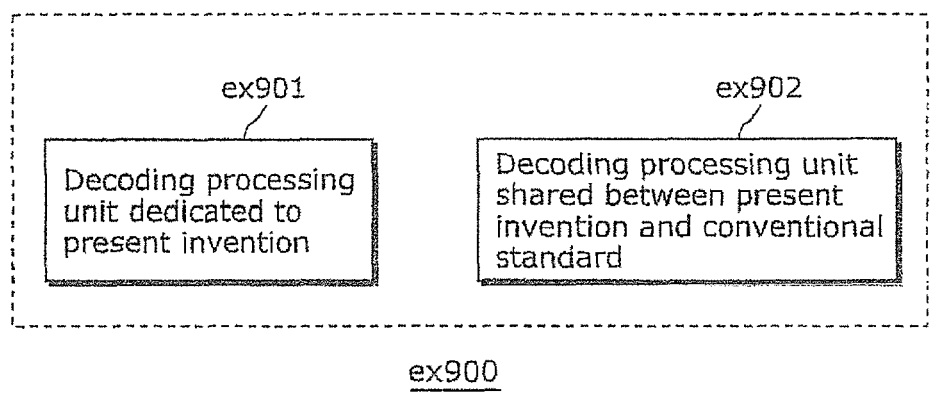

[Fig. 40B]
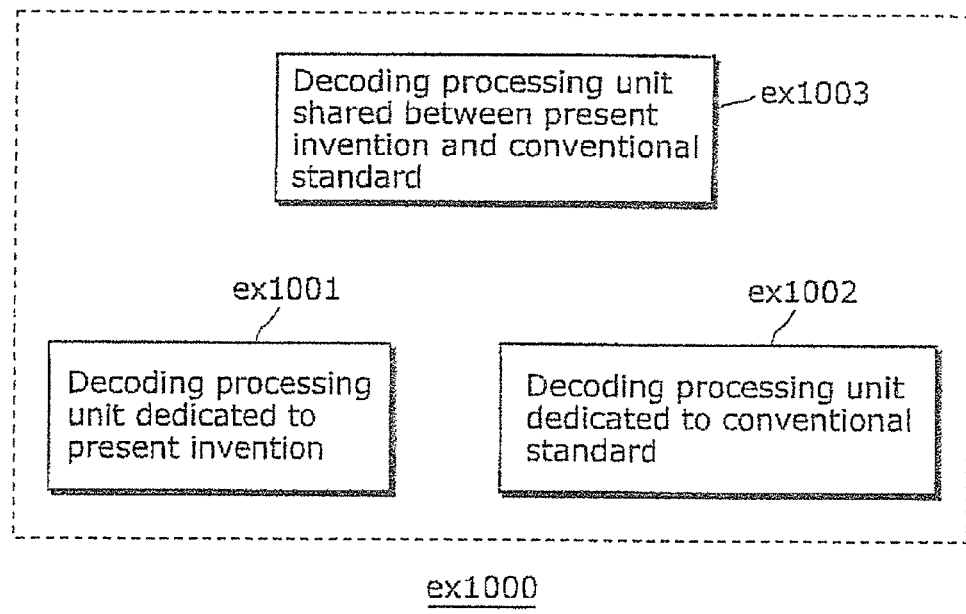

METHODS AND APPARATUSES FOR ENCODING AND DECODING VIDEO USING MULTIPLE REFERENCE PICTURES

This application claims the benefit of U.S. Provisional Application No. 61/431,885, filed Jan. 12, 2011.

TECHNICAL FIELD

The present invention relates to methods of encoding and decoding video using multiple reference pictures, and apparatuses thereof, and more particularly, for inter picture prediction.

BACKGROUND ART

State-of-the-art video coding schemes, such as MPEG-4 AVC/H.264, and the upcoming HEVC (High-Efficiency Video Coding), support inter-picture prediction utilizing motion-compensated prediction from more than one reference pictures. These schemes also support a special type of bi-direction inter-picture prediction where both directions are pointing to the same direction in time. FIG. 1 shows an example of such forward bi-predictive inter-picture prediction. In the case where there are more than one reference picture, two lists of reference pictures are created for bi-predictive inter-picture prediction and the reference pictures that are closer to the current picture (i.e., temporal distance) are sorted to the top of the lists by a predefined process.

It is against this background that the present invention has been developed.

CITATION LIST

Non Patent Literature

NPL 1: ISO/IEC 14496-10, "MPEG-4 Part 10 Advanced Video Coding"

SUMMARY OF INVENTION

Technical Problem

A problem with the prior art is that reference frames/pictures closest to the current picture are always sorted to the top of the lists. However, the closest reference frames to the current picture may not always be the best reference frames to be used for forward bi-predictive inter-picture prediction.

Solution to Problem

According to embodiment(s) of the present invention, methods of encoding/decoding video are provided to solve or at least mitigate the problem associated with the prior art described hereinbefore. For example, the methods allow the inter picture prediction using two reference lists where one of the lists is ordered based on a flag or a parameter such as the quality of the reference pictures/frames.

By way of example, according to embodiment(s) of the present invention, when forward bi-predictive inter-picture prediction is used, two reference lists are created where one of the reference lists is ordered based on the quality of the reference pictures or frames while the other reference list is ordered based on the nearest temporal distance to the current picture or frame.

The effect of embodiment(s) of the present invention is in the form of improvement in coding efficiency as, for example, two different reference pictures lists are provided to improve the picture quality with minimal or negligible increase in overhead information.

In accordance to a first broad aspect of the present invention, there is provided a method of encoding video using a plurality of reference pictures, the method comprising:

writing one of a parameter or a flag into one or more reference pictures of the plurality of reference pictures;

creating a first list of reference pictures comprising the plurality of reference pictures sorted based on the parameter or flag; and encoding a current picture of the video using at least the first list of reference pictures.

The step of encoding a current picture may comprise performing motion estimation and motion prediction for the current picture using at least the first list of reference pictures.

The step of writing may comprise writing the parameter or flag into a header of the reference picture.

In the case where the step of writing comprises writing a flag into said one or more reference pictures, the method may further comprise:

determining if the flag is of a predefined value;

wherein, if the flag is of the predefined value, creating the first list of reference pictures sorted based on a quality of the reference pictures, and wherein, if the flag is not of the predefined value, creating the first list of reference pictures sorted based on an inter-picture prediction dependency of the reference pictures.

In the case where the step of writing comprises writing a flag into said one or more reference pictures, the method may further comprise:

determining if the reference picture comprises the flag having a predefined value, for each of the plurality of reference picture;

wherein, if the flag of the reference picture is of a predefined value;

labeling the reference picture as a first type of reference picture;

wherein, if the flag of the reference picture is not of a predefined value, labeling the reference picture as a second type of reference picture;

creating the first list of reference pictures sorted by ordering the reference picture labeled as the first type higher in the first list than the reference picture labeled as the second type.

The step of labeling the reference picture as a first type of reference picture may comprise:

labeling the reference picture as a long-term reference picture;

setting a long-term index value to a predefined value;

locating a previously reconstructed long term reference picture in a memory having said long-term index value; and replacing said long term reference picture with said labeled picture if said long term reference picture is located in said memory.

Preferably, the reference picture labeled as the first type is ordered at the top of the first list.

The method may further comprise creating a second list of reference pictures and a third list of reference pictures, each of the second and third lists sorted based on a temporal distance to the current picture.

The method may further comprise determining if the second list matches the third list, wherein, if the second list matches the third list, creating the first list of reference pictures sorted based on the parameter or flag, and encoding the current picture of the video using at least the first list of reference pictures; and wherein, if the second list does not match the third list, encoding the current picture of the video using the second list and the third list.

In accordance to a second broad aspect of the present invention, there is provided a method of decoding video using a plurality of reference pictures, the method comprising:

parsing one of a parameter or flag from one or more reference pictures of the plurality of reference pictures;

creating a first list of reference pictures comprising the plurality of reference pictures sorted based on the parameter or flag; and decoding a current picture of the video using at least the first list of reference pictures.

The step of decoding a current picture may comprise performing motion prediction for the current picture using at least the first list of reference pictures.

The step of parsing may comprise parsing the parameter or flag from a header of the reference picture.

In the case where the step of parsing comprises parsing the flag from said one or more reference pictures, the method may further comprise:

determining if the flag is of a predefined value;

wherein, if the flag is of the predefined value, creating the first list of reference pictures sorted based on a quality of the reference pictures, and wherein, if the flag is not of the predefined value, creating the first list of reference pictures sorted based on an inter-picture prediction dependency of the reference pictures.

In the case where the step of parsing comprises parsing the flag from said one or more reference pictures, the method may further comprise:

determining if the reference picture comprises the flag having a predefined value, for each of the plurality of reference picture;

wherein, if the flag of the reference picture is of a predefined value;

labeling the reference picture as a first type of reference picture;

wherein, if the flag of the reference picture is not of a predefined value, labeling the reference picture as a second type of reference picture;

creating the first list of reference pictures sorted by ordering the reference picture labeled as the first type higher in the first list than the reference picture labeled as the second type.

The step of labeling the reference picture as a first type of reference picture may comprise:

labeling the reference picture as a long-term reference picture;

setting a long-term index value to a predefined value;

locating a previously reconstructed long term reference picture in a memory having said long-term index value; and replacing said long term reference picture with said labeled picture if said long term reference picture is located in said memory.

Preferably, the reference picture labeled as the first type is ordered at the top of the first list.

The method may further comprise creating a second list of reference pictures and a third list of reference pictures, each of the second and third lists sorted based on a temporal distance to the current picture.

The method may further comprise determining if the second list matches the third list, wherein, if the second list matches the third list, creating the first list of reference pictures sorted based on the parameter or flag, and encoding the current picture of the video using at least the first list of reference pictures; and wherein, if the second list does not match the third list, encoding the current picture of the video using the second list and the third list.

In accordance to a third broad aspect of the present invention, there is provided an apparatus for encoding video using a plurality of reference pictures, the apparatus comprising:

a writing unit configured to write one of a parameter or flag into one or more reference pictures of the plurality of reference pictures;

a first list creation unit configured to create a first list of reference pictures comprising the plurality of reference pictures sorted based on the parameter or flag; and an encoding section configured to encode a current picture of the video using at least the first list of reference pictures.

The encoding section may comprise a motion estimation unit configured to perform motion estimation for the current picture using at least the first list of reference pictures and a motion prediction unit configured to perform motion prediction for the current picture using at least the first list of reference pictures.

The writing unit may be configured to write the parameter or flag into a header of the reference picture.

In the case where the writing unit is configured to write the flag into said one or more reference pictures, the apparatus may further comprise:

a determining unit configured to determine if the flag is of a predefined value;

wherein, if the flag is of the predefined value, the first list creation unit is operable to create the first list of reference pictures sorted based on the quality of the reference pictures, and wherein, if the flag is not of the predefined value, the first list creation unit is operable to create the first list of reference pictures sorted based on an inter-picture prediction dependency of the reference pictures.

In the case where the writing unit is configured to write the flag into said one or more reference pictures, the apparatus may further comprise:

a determining unit configured to determine if the reference picture comprises the flag having a predefined value, for each of the plurality of reference picture; and a labeling unit configured to label the reference picture, wherein, if the flag of the reference picture is of a predefined value;

the labeling unit is operable to label the reference picture as a first type of reference picture;

wherein, if the flag of the reference picture is not of a predefined value, the labeling unit is operable to label the reference picture as a second type of reference picture; and wherein the first list creation unit is operable to create the first list of reference pictures sorted by ordering the reference picture labeled as the first type higher in the first list than the reference picture labeled as the second type.

The labeling of the reference picture as a first type of reference picture may comprise:

labeling the reference picture as a long-term reference picture;

setting a long-term index value to a predefined value;

locating a previously reconstructed long term reference picture in a memory having said long-term index value; and replacing said long term reference picture with said labeled picture if said long term reference picture is located in said memory.

Preferably, the reference picture labeled as the first type is ordered at the top of the first list.

The apparatus may further comprise a second list creation unit configured to create a second list of reference pictures and a third list creation unit configured to create a third list of reference pictures, each of the second and third lists being sorted based on a temporal distance to the current picture.

The apparatus may further comprise a determining unit configured for determining if the second list matches the third list, wherein, if the second list matches the third list, the first list creation unit is operable to create the first list of reference pictures sorted based on the parameter or flag, and the encoding section is operable to encode the current picture of the video using at least the first list of reference pictures; and wherein, if the second list does not match the third list, the encoding section is operable to encode the current picture of the video using the first list and the second list.

In accordance to a fourth broad aspect of the present invention, there is provided an apparatus for decoding video using a plurality of reference pictures, the apparatus comprising:

a parsing unit configured for parsing one of a parameter or flag from one or more reference pictures of the plurality of reference pictures;

a first list creation unit configured to create a first list of reference pictures comprising the plurality of reference pictures sorted based on the parameter or flag; and a decoding section configured to decode a current picture of the video using at least the first list of reference pictures.

The decoding section may comprise a motion prediction unit configured to perform motion prediction for the current picture using at least the first list of reference pictures.

The parsing unit may be configured to parse the parameter or flag from a header of the reference picture.

In the case where the parsing unit is configured to parse the flag from said one or more reference pictures, the apparatus may further comprise:

a determining unit configured to determine if the flag is of a predefined value;

wherein, if the flag is of the predefined value, the first list creation unit is operable to create the first list of reference pictures sorted based on a quality of the reference pictures, and wherein, if the flag is not of the predefined value, the first list creation unit is operable to create the first list of reference pictures sorted based on an inter-picture prediction dependency of the reference pictures.

In the case where the parsing unit is configured to parse the flag from said one or more reference pictures, the method may further comprise:

a determining unit configured to determine if the reference picture comprises the flag having a predefined value, for each of the plurality of reference picture; and a labeling unit configured to label the reference picture, wherein, if the flag of the reference picture is of a predefined value;

the labeling unit is operable to label the reference picture as a first type of reference picture;

wherein, if the flag of the reference picture is not of a predefined value, the labeling unit is operable to label the reference picture as a second type of reference picture; and wherein the first list creation unit is operable to create the first list of reference pictures sorted by ordering the reference picture labeled as the first type higher in the first list than the reference picture labeled as the second type.

The labeling of the reference picture as a first type of reference picture may comprise:

labeling the reference picture as a long-term reference picture;

setting a long-term index value to a predefined value;

locating a previously reconstructed long term reference picture in a memory having said long-term index value; and replacing said long term reference picture with said labeled picture if said long term reference picture is located in said memory.

Preferably, the reference picture labeled as the first type is ordered at the top of the first list.

The apparatus may further comprise a second list creation unit configured to create a second list of reference pictures and a third list creation unit configured to create a third list of reference pictures, each of the second and third lists being sorted based on a temporal distance to the current picture.

The determining unit may be further configured for determining if the second list matches the third list, wherein, if the second list matches the third list, the first list creation unit is operable to create the first list of reference pictures sorted based on the parameter or flag, and the decoding section is operable to decode the current picture of the video using at least the first list of reference pictures; and wherein, if the second list does not match the third list, the decoding section is operable to decode the current picture of the video using the second list and the third list.

BRIEF DESCRIPTION OF DRAWINGS

FIG. 1 depicts a diagram illustrating an example of bi-predictive inter picture prediction with both predictions in the same direction;

FIG. 2 depicts a flowchart showing a video encoding process according to a first exemplary embodiment of the present invention;

FIG. 3 depicts a flowchart showing a video decoding process according to the first exemplary embodiment of the present invention;

FIG. 4 depicts a diagram illustrating an example of assigning different quality levels for different pictures consecutively according to embodiment(s) of the present invention;

FIG. 5 depicts a flowchart showing a video encoding process according to a second exemplary embodiment of the present invention;

FIG. 6 depicts a flowchart showing a video decoding process according to the second exemplary embodiment of the present invention;

FIG. 7 depicts a block diagram illustrating an example apparatus for a video encoder according to the second embodiment of the present invention;

FIG. 8 depicts a block diagram illustrating an example apparatus for a video decoder according to the second embodiment of the present invention;

FIG. 9 depicts a diagram showing a preferred location of the quality identifier parameter in a header of a picture;

FIG. 10A depicts a flowchart showing a video encoding process according to a third embodiment of the present invention;

FIG. 10B depicts a flowchart showing a video encoding process according to an embodiment of the present invention;

FIG. 11A depicts a flowchart showing a video decoding process according to the third embodiment of the present invention;

FIG. 11B depicts a flowchart showing a video decoding process according to an embodiment of the present invention;

FIG. 12 depicts a block diagram illustrating an example apparatus for a video encoder according to the third embodiment of the present invention;

FIG. 13 depicts a block diagram illustrating an example apparatus for a video decoder according to the third embodiment of the present invention;

FIG. 14 depicts a diagram showing a preferred location of special picture flag in a header of a picture;

FIG. 15A depicts a flowchart showing a video encoding process according to a fourth embodiment of the present invention;

FIG. 15B depicts a flowchart showing a video encoding process according to an embodiment of the present invention;

FIG. 16A depicts a flowchart showing video decoding process according to the fourth embodiment of the present invention;

FIG. 16B depicts a flowchart showing video decoding process according to an embodiment of the present invention;

FIG. 17 depicts a block diagram illustrating an example apparatus for a video encoder according to the fourth embodiment of the present invention;

FIG. 18 depicts a block diagram illustrating an example apparatus for a video decoder according to the fourth embodiment of the present invention;

FIG. 19 depicts a diagram showing a preferred location of the reordering scheme selection parameter in a header of a picture;

FIG. 20 depicts a flowchart showing a process to label a picture as a special reference picture in the third embodiment of the present invention;

FIG. 21 depicts a block diagram showing an example apparatus to label a picture as a special reference picture in the third embodiment of present invention;

FIG. 22 depicts an overall configuration of a content providing system for implementing content distribution services according to an embodiment of the present invention;

FIG. 23 depicts an overall configuration of a digital broadcasting system according to an embodiment of the present invention;

FIG. 24 depicts a block diagram illustrating an example of a configuration of a television according to an embodiment of the present invention;

FIG. 25 depicts a block diagram illustrating an example of a configuration of an information reproducing/recording unit that reads and writes information from or on a recording medium that is an optical disk according to an embodiment of the present invention;

FIG. 26 depicts a drawing showing an example of a configuration of a recording medium that is an optical disk according to an embodiment of the present invention.

FIG. 27A depicts a drawing illustrating an example of a cellular phone according to an embodiment of the present invention;

FIG. 27B depicts a block diagram showing an example of a configuration of the cellular phone according to an embodiment of the present invention;

FIG. 28 depicts a drawing showing a structure of multiplexed data according to an embodiment of the present invention;

FIG. 29 depicts a drawing schematically illustrating how each of the streams is multiplexed in multiplexed data according to an embodiment of the present invention;

FIG. 30 depicts a drawing illustrating how a video stream is stored in a stream of PES packets in more detail according to an embodiment of the present invention;

FIG. 31 depicts a drawing showing a structure of TS packets and source packets in the multiplexed data according to an embodiment of the present invention;

FIG. 32 depicts a drawing showing a data structure of a PMT according to an embodiment of the present invention;

FIG. 33 depicts a drawing showing an internal structure of multiplexed data information according to an embodiment of the present invention;

FIG. 34 depicts a drawing showing an internal structure of stream attribute information according to an embodiment of the present invention;

FIG. 35 depicts drawing showing steps for identifying video data according to an embodiment of the present invention;

FIG. 36 depicts a block diagram illustrating an example of a configuration of an integrated circuit for implementing the video coding method and the video decoding method according to each of Embodiments.

FIG. 37 depicts a drawing showing a configuration for switching between driving frequencies according to an embodiment of the present invention;

FIG. 38 depicts a drawing showing steps for identifying video data and switching between driving frequencies according to an embodiment of the present invention;

FIG. 39 depicts a drawing showing an example of a look-up table in which the standards of video data are associated with the driving frequencies according to an embodiment of the present invention;

FIG. 40A depicts a drawing showing an example of a configuration for sharing a module of a signal processing unit according to an embodiment of the present invention; and FIG. 40B depicts a drawing showing another example of a configuration for sharing a module of a signal processing unit according to an embodiment of the present invention.

DESCRIPTION OF EMBODIMENTS

According to exemplary embodiments of the present invention, there are provided a method of encoding video using a plurality of reference pictures/frames, a method of decoding video using a plurality of reference pictures, and apparatuses thereof.

FIG. 2 depicts a flowchart illustrating a method of encoding video using a plurality of reference pictures according to a first exemplary embodiment of the present invention. As a first step 200, the method comprises writing one of a parameter or a flag into one or more reference pictures of the plurality of reference pictures. For example, the parameter of a reference picture may include a value representative of the quality of the reference picture such as the level of quantization that was used to compress the reference picture, and the flag of a reference picture may be a signal indicative of a characteristic of the reference picture, such as to indicate the reference picture as being special. These and other examples will be described in further detail hereinafter. It will be apparent to the person skilled in the art that the present invention is not limited to the examples described herein, and other types of parameter or flag are also encompassed within the scope of the present invention.

The method of encoding video further comprises a step 202 of creating a first list of reference pictures comprising the plurality of reference pictures sorted based on the parameter or flag. For example, in the case of the parameter being representative of the quality of the reference picture, step 202 creates a first list of reference pictures sorted based on the quality of the reference picture, more particular, higher or better quality reference pictures are arranged so as to be at the top of the first list.

The method of encoding video further comprises a step 204 of encoding a current picture of the video using at least the first list of reference pictures. For example, encoding the current picture comprises performing motion estimation and motion prediction for the current picture using at least the first list of reference pictures.

FIG. 3 depicts a flowchart illustrating a method of decoding video using a plurality of reference pictures according to the first exemplary embodiment. As a first step 220, the method comprises parsing one of a parameter or a flag from one or more reference pictures of the plurality of reference pictures. As described hereinbefore, by way of examples only, the parameter of a reference picture may include a value representative of the quality of the reference picture such as the level of quantization that was used to compress the reference picture, and the flag of a reference picture may be a signal indicative of a characteristic of the reference picture, such as to indicate the reference picture as being special.

The method of decoding video further comprises a step 222 of creating a first list of reference pictures including the plurality of reference pictures sorted based on the parameter or flag; and decoding a current picture of the video using at least the first list of reference pictures. For example, decoding the current picture comprises performing motion prediction for the current picture using at least the first list of reference pictures.

An apparatus for encoding video using a plurality of reference pictures according to the first exemplary embodiment of the present invention comprises a writing unit, a first list creation unit, and an encoding section. The writing unit is configured to write the parameter or flag into one or more reference pictures of the plurality of reference pictures, the first list creation unit is configured to create the first list of reference pictures comprising the plurality of reference pictures sorted based on the parameter or flag; and the encoding section is configured to encode the current picture of the video using at least the first list of reference pictures. For example, the encoding section may comprise a motion estimation unit configured to perform motion estimation for the current picture using at least the first list of reference pictures and a motion prediction unit configured to perform motion prediction for the current picture using at least the first list of reference pictures.

An apparatus for decoding video using a plurality of reference pictures according to the first exemplary embodiment of the present invention comprises a parsing unit configured for parsing the parameter or flag from one or more reference pictures of the plurality of reference pictures, a first list creation unit configured to create the first list of reference pictures comprising the plurality of reference pictures sorted based on the parameter or flag, and an decoding section configured to decode the current picture of the video using at least the first list of reference pictures. For example, the decoding section may comprise a motion prediction unit configured to perform motion prediction for the current picture using at least the first list of reference pictures.

The first exemplary embodiment of the present invention has been found to provide an improvement in encoding/decoding efficiency. As discussed in the background, a problem with the prior art is that reference pictures closest to the current picture are always sorted to the top of the reference lists. However, according to the first exemplary embodiment of the present invention, a parameter or flag is written or embedded into the reference pictures and at least one reference list is created with reference pictures sorted based on the parameter or flag. For example, the case where the parameter indicates the quality of the reference picture is graphically illustrated in FIG. 4. Based on prior art teaching, as an example, the reference list for Picture n would be created only based on the temporal distance, that is, Picture n+1 being closest to Picture n would be arranged at the top of the reference list, followed by Picture n+2, Picture n+3 and Picture n+4 being at the bottom of the reference list. However, due to the poor quality of Picture n+1, this may not be the best reference frame to use for inter picture prediction and thus it is not efficient to arrange such a picture at the top of the list. In contrast, according to the first exemplary embodiment, Picture n+4 having been assigned a parameter with the highest quality amongst Picture n+1 to n+4 would be arranged at the top of the reference list, followed by Picture n+2, Picture n+1 and Picture n+3. As a result, the most suitable or appropriate reference(s) picture is arranged at the top of the reference list which is therefore represented with the least bits for use in inter picture prediction. Accordingly, better encoding/decoding of video can be achieved according to the first exemplary embodiment of the present invention.

Further exemplary embodiments of the present invention will now be described hereinafter with reference to Figures, providing more specific examples of the first exemplary embodiments of the present invention. It will be appreciated to the person skilled in the art that the exemplary embodiments described hereinafter are merely provided by way of examples and do not restrict the scope of the present invention.

FIG. 5 shows a flowchart illustrating a process or method of encoding video according to a second exemplary embodiment of the present invention. As shown in FIG. 5, in step 300, a parameter (e.g., a quality identifier parameter) is first written or embedded into a header of a coded reference picture for indicating or classifying the picture quality of the reference picture. For example, the quality identifier parameter may comprise values that ranks the different pictures based on the level of quantization that was used to compress the pictures. It will be apparent to the person skilled in the art that the quality of a picture can be represented or indicated by other means. In step 302, a first list of reference pictures sorted by a first scheme that uses temporal distance to a current picture is created. Next in step 304, a second list of reference pictures sorted by a second scheme that also uses temporal distance to a current picture is created. And in step 306, a comparison is performed to determine or judge if the first list matches (e.g., identical to) the second list.

If the first list matches the second list, a third list of reference pictures (e.g., corresponding to the first list of reference pictures described in the first exemplary embodiment) sorted by the quality of reference pictures is created in step 312. Next, a motion estimation process is performed for a current picture (e.g., a block of image samples) using at least the third list of reference pictures in step 314 and a motion prediction process is performed for the current picture using at least the third list of reference pictures in step 316. For example, the motion estimation process and/or the motion prediction process may be performed using the second and third lists of reference pictures, or using the first and third lists of reference pictures.

If the first list does not match the second list in step 306, a motion estimation process is performed for a current picture using the first and second lists of reference frames in step 308 and a motion prediction process is performed for the current picture using the first and second lists of reference frames in step 310.

In an embodiment, the logic at step 306 may be switched. In particular, if the first list matches the second list, a motion estimation process is performed for a current picture using the first and second lists of reference frames in step 308 and a motion prediction process is performed for the current picture using the first and second lists of reference frames in step 310. On the other hand, if the first list does not match the second list in step 306, a third list of reference pictures (e.g., corresponding to the first list of reference pictures described in the first exemplary embodiment) sorted by the quality of reference pictures is created in step 312. Next, a motion estimation process is performed for a current picture (e.g., a block of image samples) using at least the third list of reference pictures in step 314 and a motion prediction process is performed for the current picture using at least the third list of reference pictures in step 316. Similarly, the motion estimation process and/or the motion prediction process may be performed using the second and third lists of reference pictures, or using the first and third lists of reference pictures.

FIG. 6 shows a flowchart illustrating a process or method of decoding video according to the second exemplary embodiment of the present invention. As shown in FIG. 6, in step 400, a parameter (e.g., a quality identifier parameter) is first parsed or retrieved from a header of a coded reference picture for determining or classifying the picture quality of the reference picture. For example, the quality identifier parameter may comprise values that ranks the different pictures based on the level of quantization that was used to compress the pictures. In step 402, a first list of reference pictures sorted by a first scheme that uses temporal distance to a current picture is created. Next in step 404, a second list of reference pictures sorted by a second scheme that also uses temporal distance to a current picture is created. And in step 406, a comparison is performed to determine or judge if the first list matches (e.g., identical to) the second list.

If the first list matches the second list, a third list of reference pictures (e.g., corresponding to the first list of reference pictures described in the first exemplary embodiment) sorted by the quality of reference pictures is created in step 410. Next, a motion prediction process is performed for a current picture (e.g., a block of image samples) using at least the third list of reference pictures in step 412. For example, the motion prediction process may be performed using the second and third lists of reference pictures, or using the first and third lists of reference pictures.

If the first list does not match the second list in step 406, a motion prediction process is performed for a current picture using the first and second lists of reference frames in step 408.

In an embodiment, the logic at step 406 may also be switched. In particular, if the first list matches the second list, a motion prediction process is performed for a current picture using the first and second lists of reference frames in step 408. If the first list does not match the second list in step 406, a third list of reference pictures (e.g., corresponding to the first list of reference pictures described in the first exemplary embodiment) sorted by the quality of reference pictures is created in step 410. Next, a motion prediction process is performed for a current picture (e.g., a block of image samples) using at least the third list of reference pictures in step 412. Similarly, the motion prediction process may be performed using the second and third lists of reference pictures, or using the first and third lists of reference pictures.

FIG. 7 shows a block diagram illustrating an example apparatus for encoding video according to the second exemplary embodiment of the present invention. For the sake of clarity, the example encoding apparatus will be described corresponding to the exemplary method as described with respect to FIG. 5 and whereby the motion estimation process and the motion prediction process are performed using the second and third lists of reference pictures. However, it will be apparent to the person skilled in the art that modifications can be made to the example apparatus shown in FIG. 7 to implement any one of the methods of encoding video disclosed herein (e.g., the method as shown in FIG. 2) or other methods without departing from the scope of the present invention. That is, the apparatus for encoding video according to the present invention is not limited to the components/elements, and the interconnections thereof, as shown in FIG. 7.

The exemplary apparatus for encoding video comprises of a motion estimation unit 500, a motion prediction unit 502, a first list creation unit 504, a second list creation unit 516, a third list creation unit 510, a first switch unit 506, a second switch unit 508, a memory unit 512, a comparator unit or a determining unit 514 and writing unit 518.

As shown in FIG. 7, the motion estimation unit 500 is configured or operable to read a current picture (e.g., a block of image samples) D501, a selected list of reference pictures D511, a second list of reference pictures D519 and output a set of motion vectors D503. The motion prediction unit 502 is configured to read the set of motion vectors D503, the selected list of reference pictures D511 and the second list of reference pictures D519 and output a block of predicted samples D505. The first list creation unit 504 is configured to read reference pictures D513 from the memory unit 512 and output a first list of reference pictures D1015. The second list creation unit 516 is configured to read reference pictures D1017 from the memory unit 512 and output a second list of reference pictures D519. The comparator unit 514 is configured to read both the first list of reference pictures D515 and the second list of reference pictures D519 and output a control signal D521 to control the first and second switch units 506 and 508. The first switch unit 504 is configured to send the first list of reference pictures D515 to either the second switch unit 508 or the third list creation unit 510 based on the control signal D521. The third list creation unit 510 is configured to create a third list of reference pictures D523 based on the first list of reference pictures D509 and the parameter (e.g., the quality identifier parameter of the reference pictures) D525 stored in the memory unit 512. The second switch unit 508 is configured to select either the first list of reference pictures D507 or the third list of reference pictures D523 based on the control signal D521. The writing unit 518 is configured to read the parameter and write the parameter into a header of a coded picture D1029.

FIG. 8 shows a block diagram illustrating an example apparatus for decoding video according to the second exemplary embodiment of the present invention. For the sake of clarity, the example decoding apparatus will be described corresponding to the exemplary method as described with respect to FIG. 6 and whereby the motion prediction process is performed using the second and third lists of reference pictures. However, it will be apparent to the person skilled in the art that modifications can be made to the example apparatus shown in FIG. 8 to implement any one of the methods of decoding video disclosed herein (e.g., as shown in FIG. 3) or other methods without departing from the scope of the present invention. That is, the apparatus for decoding video according to the present invention is not limited to the components/elements, and the interconnections thereof, as shown in FIG. 8.

The example apparatus for decoding video comprises of a parsing unit 600, a motion prediction Unit 602, a first list creation unit 604, a second list creation unit 616, a third list creation unit 610, a first switch unit 606, a second switch unit 608, a memory unit 612 and a comparator unit or a determining unit 614.

As shown in FIG. 8, the motion prediction unit 602 is configured or operable to read a decoded set of motion vectors D601, a selected list of reference pictures D611 and a second list of reference pictures D619 and output a block of predicted samples D605. The first list creation unit 604 is configured to read reference pictures D613 from the memory unit 612 and output a first list of reference pictures D615. The second list creation unit 616 is configured to read reference pictures D617 from the memory unit 612 and output a second list of reference pictures D619. The comparator unit 614 is configured to read both the first list of reference pictures D615 and the second list of reference pictures D619 and output a control signal D621 to control the first and second switch units 606 and 608. The first switch unit 604 is configured to send the first list of reference pictures D615 to either the second switch unit 608 or the third list creation unit 610 based on the control signal D621. The third list creation unit 610 is configured to create a third list of reference pictures D623 based on the first list of reference pictures D609 and the parameter (e.g., the quality identifier parameter) of the reference pictures D625 stored in the memory unit 612. The second switch unit 608 is configured to select either the first list of reference pictures D607 or the third list of reference pictures D623 based on the control signal D621. The parsing unit 600 is configured to parse a header of a coded picture D627 and outputs the parameter D603 into a memory unit 612.

FIG. 9 shows a diagram illustrating a preferred location of the parameter in a header of a picture according to the second exemplary embodiment of the present invention. In the case of the parameter being a quality identifier parameter, for example, the value of the quality identifier parameter is determined according to the level of quantization used to compress the picture.

FIG. 10A shows a flowchart illustrating a process or method of encoding video according to a third exemplary embodiment of the present invention. As shown in FIG. 10A, in step 800, a special reference picture flag is first written or embedded into a header of a coded reference picture to label a reference picture as a special reference picture or a normal reference picture. For example, a special reference picture may be a picture with a lower level of quantization among a group of pictures. In step 802, a comparison is performed to determine or judge if this flag has or is of a predefined value. A reference picture is labeled as a special reference picture in step 804 if the flag is of a predefined value and labeled as a normal reference picture in step 806 if the flag does not have a predefined value.

In step 808, a first list of reference pictures is sorted by a first scheme that uses temporal distance to a current picture is created. Next in step 810, a second list of reference pictures sorted by a second scheme that also uses temporal distance to a current picture is created. In step 812, a comparison is performed to determine or judge if the first list matches (e.g., identical to) the second list.

If the first list matches the second list, the special reference pictures in the first list of reference frames is identified in step 814 and a third list of reference pictures (e.g., corresponding to the first list of reference pictures described in the first exemplary embodiment), which is sorted by placing the special reference pictures to the top of the list, is created in step 820. Next, a motion estimation process is performed for a current picture (e.g., a block of image samples) using at least the third list of reference pictures in step 822 and a motion prediction process is performed for the current picture using at least the third list of reference pictures in step 824. For example, the motion estimation process and/or the motion prediction process may be performed using the second and third lists of reference pictures, or using the first and third lists of reference pictures.

If the first list does not match the second list in step 812, a motion estimation process is performed for the current picture using the first and second lists of reference frames in step 816 and a motion prediction process is performed for the current picture using the first and second lists of reference frames in step 818.

In an embodiment, the logic at step 812 may be switched. In particular, if the first list matches the second list, a motion estimation process is performed for the current picture using the first and second lists of reference frames in step 816 and a motion prediction process is performed for the current picture using the first and second lists of reference frames in step 818. If the first list does not match the second list in step 812, the special reference pictures in the first list of reference frames is identified in step 814 and a third list of reference pictures (e.g., corresponding to the first list of reference pictures described in the first exemplary embodiment), which is sorted by placing the special reference pictures to the top of the list, is created in step 820. Next, a motion estimation process is performed for a current picture (e.g., a block of image samples) using at least the third list of reference pictures in step 822 and a motion prediction process is performed for the current picture using at least the third list of reference pictures in step 824. Similarly, the motion estimation process and/or the motion prediction process may be performed using the second and third lists of reference pictures, or using the first and third lists of reference pictures.

Yet another embodiment is shown in FIG. 10B. In particular, the steps 808, 810, 812, 816 and 818 as shown in FIG. 10A are omitted. Accordingly, after step 804 or 806, the reference pictures labeled as special are identified in step 864 and a first list of reference pictures (e.g., corresponding to the first list of reference pictures described in the first exemplary embodiment), which is sorted by placing the special reference pictures to the top of the list, is created in step 820. Next, a motion estimation process is performed for a current picture (e.g., a block of image samples) using at least the first list of reference pictures in step 872 and a motion prediction process is performed for the current picture using at least the first list of reference pictures in step 874.

FIG. 11A shows a flowchart illustrating a process or method for decoding video according to the third exemplary embodiment of the present invention. As shown in FIG. 11A, in step 900, a special reference picture flag is first parsed or retrieved from a header of a coded reference picture to label a reference picture as a special reference picture or a normal reference picture. For example, a special reference picture may be a picture with a lower level of quantization among a group of pictures. In step 902, a comparison is performed to determine or judge if this flag has or is of a predefined value. A reference picture is labeled as a special reference picture in step 904 if the flag is of a predefined value and labeled as a normal reference picture in step 906 if the flag is not of a predefined value.

In step 908, a first list of reference pictures sorted by a first scheme that uses temporal distance to a current picture is created. Next in step 910, a second list of reference pictures sorted by a second scheme that also uses temporal distance to a current picture is created. And in step 912, a comparison is performed to determine or judge if the first list matches (e.g., identical to) the second list.

If the first list matches the second list, the special reference pictures in the first list of reference frames is identified in step 914 and a third list of reference pictures, which is sorted by placing the special reference pictures to the top of the list, is created in step 916. Next, a motion prediction process is performed for a current picture (a block of image samples) using at least the third list of reference pictures in step 918.

If the first list does not match the second list in step 912, a motion prediction process is performed for the current picture using the first and second lists of reference frames in step 920.

In an embodiment, the logic at step 912 may be switched. In particular, if the first list matches the second list, a motion prediction process is performed for the current picture using the first and second lists of reference frames in step 920. If the first list does not match the second list in step 812, the special reference pictures in the first list of reference frames is identified in step 914 and a third list of reference pictures, which is sorted by placing the special reference pictures to the top of the list, is created in step 916. Next, a motion prediction process is performed for a current picture (a block of image samples) using at least the third list of reference pictures in step 918. Similarly, the motion prediction process may be performed using the second and third lists of reference pictures, or using the first and third lists of reference picture.

Yet another embodiment is shown in FIG. 11B. In particular, the steps 908, 910, 912 and 920 as shown in FIG. 11A are omitted. Accordingly, after step 904 or 906, the reference pictures labeled as special are identified in step 964 and a first list of reference pictures, which is sorted by placing the special reference pictures to the top of the list, are created in step 966. Next, a motion prediction process is performed for a current picture (a block of image samples) using at least the first list of reference pictures in step 968.

FIG. 12 shows a block diagram illustrating an example apparatus for encoding video according to the third embodiment of the present invention. For the sake of clarity, the example encoding apparatus will be described corresponding to the exemplary method as described with respect to FIG. 10A and whereby the motion estimation process and the motion prediction process are performed using the second and third lists of reference pictures. However, as previously mentioned, it will be apparent to the person skilled in the art that modifications can be made to the example apparatus shown in FIG. 12 to implement any one of the methods of encoding video disclosed herein or other methods without departing from the scope of the present invention.

The exemplary apparatus for encoding video comprises of a motion estimation unit 1000, a motion prediction unit 1002, a first list creation unit 1004, a second list creation unit 1016, a third list creation unit 1010, a first switch unit 1006, a second switch unit 1008, a memory unit 1012, a comparator unit or a determining unit 1014 and a writing unit 1018.

As shown in FIG. 12, the motion estimation unit 1000 is configured to read a block of image samples D1001, a selected list of reference pictures D1011, a second list of reference pictures D1019 and output a set of motion vectors D1003. The motion prediction unit 1002 is configured to read the set of motion vectors D1003, the selected list of reference pictures D1011 and the second list of reference pictures D1019 and output a block of predicted samples D1005. The first list creation unit 1004 is configured to read reference pictures D1013 from the memory unit 1012 and outputs a first list of reference pictures D1015. The second list creation unit 1016 is configured to read reference pictures D1017 from the memory unit 1012 and outputs a second list of reference pictures D1019. The comparator unit 1014 is configured to read both the first list of reference pictures D1015 and the second list of reference pictures D1019 and outputs a control signal D1021 to control the first and second switch units 1006 & 1008. The first switch unit 1004 is configured to send the first list of reference pictures D1015 to either the second switch unit 1008 or the third list creation unit 1010 based on the control signal D1021. The third list creation unit 1010 is configured to create a third list of reference pictures D1023 based on the first list of reference pictures D1009 and the special reference picture flags of the reference pictures D1025 stored in the memory unit 1012. The second switch unit 1008 is configured to select either the first list of reference pictures D1007 or the third list of reference pictures D1023 based on the control signal D1021. The writing unit 1018 is configured to read the special reference picture flag and write the flag into a header of a coded picture D1029.

FIG. 13 shows a block diagram illustrating an example apparatus for encoding video according to the third embodiment of the present invention. For the sake of clarity, the example decoding apparatus will be described corresponding to the exemplary method as described with respect to FIG. 11A and whereby the motion prediction process is performed using the second and third lists of reference pictures. However, it will be apparent to the person skilled in the art that modifications can be made to the example apparatus shown in FIG. 13 to implement any one of the methods of decoding video disclosed herein or other methods without departing from the scope of the present invention.

The example apparatus for encoding video comprises of a parsing unit 1100, a motion prediction unit 1102, a first list creation unit 1104, a second list creation unit 1116, a third list creation unit 1110, a first switch unit 1106, a second switch unit 1108, a memory unit 1112 and a comparator unit or a determining unit 1114.

As shown in FIG. 13, the motion prediction unit 1102 is configured to read a decoded set of motion vectors D1101, a selected list of reference pictures D1111 and a second list of reference pictures D1119 and output a block of predicted samples D1105. The first list creation unit 1104 is configured to read reference pictures D1113 from the memory unit 1112 and output a first list of reference pictures D1115. The second list creation unit 1116 is configured to read reference pictures D1117 from the memory unit 1112 and output a second list of reference pictures D1119. The comparator unit 1114 is configured to read both the first list of reference pictures D1115 and the second list of reference pictures D1119 and output a control signal D1121 to control the first and second switch units 1106 and 1108. The first switch unit 1104 is configured to send the first list of reference pictures D1115 to either the second switch unit 1108 or the third list creation unit 1110 based on the control signal D1121. The third list creation unit 1110 is configured to create a third list of reference pictures D1123 based on the first list of reference pictures D1109 and the special reference picture flags of the reference pictures D1125 stored in the memory unit 1112. The second switch unit 1108 is configured to select either the first list of reference pictures D1107 or the third list of reference pictures D1123 based on the control signal D1121. The parsing unit 1100 is configured to parse a header of a coded picture D1127 and output the special reference picture flag parameter D1103 into a memory unit 1112.

FIG. 14 shows a diagram illustrating a preferred location of the special picture flag in a header of a picture according to the third exemplary embodiment of the present invention. For example, the special picture may be defined as a picture with a lower level of quantization among a group of pictures.

FIG. 15A shows a flowchart illustrating a process or method of encoding video using the fourth embodiment of the present invention. As shown in FIG. 15A, in step 1300, a flag (e.g., a reordering scheme selection flag) is first written or embedded into a header of a current picture. For example, the flag is used to signal the two different schemes used for the reordering of the reference pictures in one of the two lists.

In step 1302, a first list of reference pictures sorted by a first scheme that uses temporal distance to a current picture is created. Next in step 1304, a second list of reference pictures sorted by a second scheme that also uses temporal distance to a current picture is created. And in step 1306, a comparison is performed to determine or judge if the first list matches (e.g., identical to) the second list.

If the first list matches the second list, a comparison is performed to determine or judge if the value of the reordering scheme selection flag has or is of a predefined value. If the flag is of a predefined value, a third list of reference pictures (e.g., corresponding to the first list of reference pictures described in the first exemplary embodiment), which is sorted by placing higher quality reference pictures to the top of the list, is created in step 1314. If the flag is not of a predefined value, a third list of reference pictures, which is sorted by prediction dependency of the reference pictures, is created in step 1320. The prediction dependency of the reference pictures refers to the dependency in inter-picture motion compensated prediction among the reference frames. Next, a motion estimation process is performed for a current picture (e.g., a block of image samples) using at least the third list of reference pictures in step 1316 and a motion prediction process is performed for the block of image samples using at least the third list of reference pictures in step 1318. For example, the motion estimation process and/or the motion prediction process may be performed using the second and third lists of reference pictures, or using the first and third lists of reference pictures.

If the first list does not match the second list in step 1306, a motion estimation process is performed for a current picture using the first and second lists of reference frames in step 1308 and a motion prediction process is performed for the current picture using the first and second lists of reference frames in step 1310.

In an embodiment, the logic at step 1306 may be switched. In particular, if the first list matches the second list, a motion estimation process is performed for a current picture using the first and second lists of reference frames in step 1308 and a motion prediction process is performed for the current picture using the first and second lists of reference frames in step 1310. On the other hand, if the first list does not match the second list in step 812, a comparison is performed to determine or judge if the value of the reordering scheme selection flag has or is of a predefined value. If the flag is of a predefined value, a third list of reference pictures (e.g., corresponding to the first list of reference pictures described in the first exemplary embodiment), which is sorted by placing higher quality reference pictures to the top of the list, is created in step 1314. If the flag is not of a predefined value, a third list of reference pictures, which is sorted by prediction dependency of the reference pictures, is created in step 1320. The prediction dependency of the reference pictures refers to the dependency in inter-picture motion compensated prediction among the reference frames. Next, a motion estimation process is performed for a current picture (e.g., a block of image samples) using at least the third list of reference pictures in step 1316 and a motion prediction process is performed for the block of image samples using at least the third list of reference pictures in step 1318. Similarly, the motion estimation process and/or the motion prediction process may be performed using the second and third lists of reference pictures, or using the first and third lists of reference pictures.

Yet another embodiment is shown in FIG. 15B. In particular, steps 1302, 1304, 1306, 1308 and 1310 shown in FIG. 15A are omitted. Accordingly, after step 1300, a comparison is performed to determine or judge if the value of the reordering scheme selection flag has or is of a predefined value. If the flag is of a predefined value, a first list of reference pictures (e.g., corresponding to the first list of reference pictures described in the first exemplary embodiment), which is sorted by placing higher quality reference pictures to the top of the list, is created in step 1364. If the flag is not of a predefined value, a first list of reference pictures, which is sorted by prediction dependency of the reference pictures, is created in step 1370. The prediction dependency of the reference pictures refers to the dependency in inter-picture motion compensated prediction among the reference frames. Next, a motion estimation process is performed for a current picture (e.g., a block of image samples) using at least the first list of reference pictures in step 1366 and a motion prediction process is performed for the block of image samples using at least the first list of reference pictures in step 1368.

FIG. 16A shows a flowchart illustrating a process or method of decoding video according to the fourth exemplary embodiment of the present invention. As shown in FIG. 16A, in step 1400, a flag (e.g., a reordering scheme selection flag) is first parsed or retrieved from a header of a current picture. For example, the flag is used to select the two different schemes used for the reordering of the reference pictures in one of the two lists.

In step 1402, a first list of reference pictures sorted by a first scheme that uses temporal distance to a current picture is created. Next in step 1404, a second list of reference pictures sorted by a second scheme that also uses temporal distance to a current picture is created. And in step 1306, a comparison is performed to determine or judge if the first list matches (e.g., identical to) the second list.

If the first list matches the second list, a comparison is performed to determine or judge if the value of the reordering scheme selection flag has or is of a predefined value. If the flag is of a predefined value, a third list of reference pictures (e.g., corresponding to the first list of reference pictures described in the first exemplary embodiment), which is sorted by placing higher quality reference pictures to the top of the list, is created in step 1412. If the flag is not of a predefined value, a third list of reference pictures, which is sorted by prediction dependency of the reference pictures, is created in step 1416. The prediction dependency of the reference pictures refers to the dependency in inter-picture motion compensated prediction among the reference frames. Next, a motion prediction process is performed for a current picture (e.g., a block of image samples) using at least the third list of reference pictures in step 1414. For example, the motion prediction process may be performed using the second and third lists of reference pictures, or using the first and third lists of reference pictures.

If the first list does not match the second list in step 1406, a motion prediction process is performed for the current picture using the first and second lists of reference frames in step 1410.

In an embodiment, the logic at step 1406 may also be switched. In particular, if the first list matches the second list, a motion prediction process is performed for the current picture using the first and second lists of reference frames in step 1410. On the other hand, if the first list does not match the second list in step 1406, a comparison is performed to determine or judge if the value of the reordering scheme selection flag has or is of a predefined value. If the flag is of a predefined value, a third list of reference pictures (e.g., corresponding to the first list of reference pictures described in the first exemplary embodiment), which is sorted by placing higher quality reference pictures to the top of the list, is created in step 1412. If the flag is not of a predefined value, a third list of reference pictures, which is sorted by prediction dependency of the reference pictures, is created in step 1416. The prediction dependency of the reference pictures refers to the dependency in inter-picture motion compensated prediction among the reference frames. Next, a motion prediction process is performed for a current picture (e.g., a block of image samples) using at least the third list of reference pictures in step 1414. Similarly, for example, the motion prediction process may be performed using the second and third lists of reference pictures, or using the first and third lists of reference pictures.

Yet another embodiment is shown in FIG. 16B. In particular, steps 1402, 1404, 1406 and 1410 shown in FIG. 16A are omitted. Accordingly, after step 1400, a comparison is performed to determine or judge if the value of the reordering scheme selection flag has or is of a predefined value in step 1458. If the flag is of a predefined value, a first list of reference pictures (e.g., corresponding to the first list of reference pictures described in the first exemplary embodiment), which is sorted by placing higher quality reference pictures to the top of the list, is created in step 1462. If the flag is not of a predefined value, a first list of reference pictures, which is sorted by prediction dependency of the reference pictures, is created in step 1466. The prediction dependency of the reference pictures refers to the dependency in inter-picture motion compensated prediction among the reference frames. Next, a motion prediction process is performed for a current picture (e.g., a block of image samples) using at least the first list of reference pictures in step 1464.

FIG. 17 shows a block diagram illustrating an example apparatus for encoding video according to the fourth exemplary embodiment of the present invention. For the sake of clarity, the example encoding apparatus will be described corresponding to the exemplary method as described with respect to FIG. 15A and whereby the motion estimation process and the motion prediction process are performed using the second and third lists of reference pictures. However, as previously mentioned, it will be apparent to the person skilled in the art that modifications can be made to the example apparatus shown in FIG. 17 to implement any one of the methods of encoding video disclosed herein or other methods without departing from the scope of the present invention. The example apparatus for encoding video comprises of a motion estimation unit 1500, a motion prediction unit 1502, a first list creation unit 1516, a second list creation unit 1522, a third list creation unit 1508, a fourth list creation unit 1510, a first switch unit 1504, a second switch unit 1506, a third switch unit 1512, a fourth switch unit 1514, a memory unit 1518, a comparator unit or a determining unit 1520 and a writing unit 1524.

As shown in FIG. 17, the motion estimation unit 1500 is configured to read a block of image samples D1501, a selected list of reference pictures D1533, a second list of reference pictures D1531 and output a set of motion vectors D1503. The motion prediction unit 1502 is configured to read the set of motion vectors D1503, the selected list of reference pictures D1533 and the second list of reference pictures D1531 and output a block of predicted samples D1539. The first list creation unit 1516 is configured to read reference pictures D1507 from the memory unit 1518 and output a first list of reference pictures D1505. The second list creation unit 1522 is configured to read reference pictures D1509 from the memory unit 1518 and output a second list of reference pictures D1511. The comparator unit 1520 is configured to read both the first list of reference pictures D1505 and the second list of reference pictures D1511 and output a control signal D1513 to control the first and second switch units 1504 & 1506. The first switch unit 1504 is configured to send the first list of reference pictures D1505 to either the second switch unit 1506 or the third switch unit 1512. The third switch unit 1512 is configured to, based on a flag (e.g., a reordering scheme selection flag) D1515, send the first list of reference frames D1517 to either the third list creation unit 1508 or the fourth list creation unit 1510. The third list creation unit 1508 is configured to, based on the first list D1521, create a new list of reference frames D1525. The fourth list creation unit 1510 is configured to, based on the first list D1523, create a new list of reference frames D1527. The fourth switch unit 1514 is configured to, based on the flag D1515, select one of the new list D1529 and send it to the second switch unit 1506. The second switch unit 1506 is configured to select either the first list of reference pictures D1519 or the selected new list of reference pictures D1529 based on the control signal D1513. The writing unit 1524 is configured to read the flag D1515 and write the flag into a header of a current picture D1537.

FIG. 18 shows a block diagram illustrating an example apparatus for decoding video according to the fourth embodiment of the present invention. For the sake of clarity, the example decoding apparatus will be described corresponding to the exemplary method as described with respect to FIG. 16A and whereby the motion prediction process is performed using the second and third lists of reference pictures. However, it will be apparent to the person skilled in the art that modifications can be made to the example apparatus shown in FIG. 18 to implement any one of the methods of decoding video disclosed herein or other methods without departing from the scope of the present invention.

The example apparatus for decoding video comprises of a parsing unit 1600, a motion prediction unit 1602, a first list creation unit 1616, a second list creation unit 1622, a third list creation unit 1608, a fourth list creation unit 1610, a first switch unit 1604, a second switch unit 1606, a third switch unit 1612, a fourth switch unit 1614, a memory unit 1618 and a comparator unit or a determining unit 1620.

As shown in FIG. 18, the parsing unit 1600 is configured to parse a header of a current picture and output the flag (e.g., the reordering scheme selection flag) D1615. The motion prediction unit 1602 is configured to read the set of motion vectors D1603, the selected list of reference pictures D1633 and the second list of reference pictures D1631 and output a block of predicted samples D1603. The first list creation unit 1616 is configured to read reference pictures D1607 from the memory unit 1618 and output a first list of reference pictures D1605. The second list creation unit 1622 is configured to read reference pictures D1609 from the memory unit 1518 and output a second list of reference pictures D1611. The comparator unit 1620 is configured to read both the first list of reference pictures D1605 and the second list of reference pictures D1611 and output a control signal D1613 to control the first and second switch units 1604 and 1606. The first switch unit 1604 is configured to send the first list of reference pictures D1605 to either the second switch unit 1606 or the third switch unit 1612. The third switch unit 1612 is configured to, based on the flag D1615, send the first list of reference frames D1617 to either the third list creation unit 1608 or the fourth list creation unit 1610. The third list creation unit 1608 is configured to, based on the first list D1621, create a new list of reference frames D1625. The fourth list creation unit 1610 is configured to, based on the first list D1623, create a new list of reference frames D1627. The fourth switch unit 1614 is configured to, based on the flag D1615, select one of the new lists D1629 and send it to the second switch unit 1606. The second switch unit 1606 is configured to select either the first list of reference pictures D1619 or the selected new list of reference pictures D1629 based on the control signal D1613.

FIG. 19 shows a diagram illustrating a preferred location of the flag in a header of a picture. In the case of the flag being a reordering scheme selection flag, for example, the flag is used to switch the scheme to create a list of reference pictures.

FIG. 20 shows a flowchart describing a process or method to label a reference picture as a special picture in the third exemplary embodiment of the present invention. As shown in the diagram, in step 1800, the current picture is labeled as a special long-term reference picture. And in step 1802, a long term index value is set to a predefined value. In step 1804, a previously reconstructed long term reference picture having the long term index equal to the predefined value is located in the memory. And finally in step 1806, the long term reference picture, if located in the memory, is replaced with the current picture in the memory.

FIG. 21 shows a diagram illustrating an example apparatus to label a picture as a special reference picture in the third embodiment of present invention. The example apparatus comprises a labeling unit 1900, an assignment unit 1902, a searching unit 1906, a replacement unit 1904 and a memory unit 1908. Firstly, the assignment unit 1902 is configured to read a predefined value D1907 and assign it to the long-term index value of a picture D1909). The labeling unit 1900 is configured to read a picture D1901 and the long-term index value D1909 and output a long-term reference picture with the assigned long-term index value D1903. The searching unit 1906 is configured to read the long-term index value D1907, search the reference pictures D1911 in the memory unit 1908 and locate the location of a long-term reference picture in the memory D1905. The replacement unit 1904 is configured to read the labeled picture D1903 and place the picture at the location of the long-term reference picture in the memory D1913.

Embodiment 5

The processing described in each of Embodiments can be simply implemented in an independent computer system, by recording, in a recording medium, a program for implementing the configurations of the video coding method and the video decoding method described in each of Embodiments. The recording media may be any recording media as long as the program can be recorded, such as a magnetic disk, an optical disk, a magnetic optical disk, an IC card, and a semiconductor memory.

Hereinafter, the applications to the video coding method and the video decoding method described in each of Embodiments and systems using thereof will be described.

FIG. 22 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 22, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of Embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Aside from the example of the content providing system ex100, at least one of the video coding apparatus and the video decoding apparatus described in each of Embodiments may be implemented in a digital broadcasting system ex200 illustrated in FIG. 23. More specifically, a broadcast station ex201 communicates or transmits, via radio waves to a broadcast satellite ex202, multiplexed data obtained by multiplexing audio data and others onto video data. The video data is data coded by the video coding method described in each of Embodiments. Upon receipt of the multiplexed data, the broadcast satellite ex202 transmits radio waves for broadcasting. Then, a home-use antenna ex204 with a satellite broadcast reception function receives the radio waves.

Next, a device such as a television (receiver) ex300 and a set top box (STB) ex217 decodes the received multiplexed data, and reproduces the decoded data.

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the video decoding apparatus or the video coding apparatus as shown in each of Embodiments. In this case, the reproduced video signals are displayed on the monitor ex219, and can be reproduced by another device or system using the recording medium ex215 on which the multiplexed data is recorded. It is also possible to implement the video decoding apparatus in the set top box ex217 connected to the cable ex203 for a cable television or to the antenna ex204 for satellite and/or terrestrial broadcasting, so as to display the video signals on the monitor ex219 of the television ex300. The video decoding apparatus may be implemented not in the set top box but in the television ex300.

FIG. 24 illustrates the television (receiver) ex300 that uses the video coding method and the video decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

As an example, FIG. 25 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

FIG. 26 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 24. The same will be true for the configuration of the computer ex111, the cellular phone ex114, and others.

FIG. 27A illustrates the cellular phone ex114 that uses the video coding method and the video decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 27B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350.

Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex356.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the video coding method shown in each of Embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method.

Then, the modulation/demodulation unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a video decoding method corresponding to the coding method shown in each of Embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the video coding method and the video decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

Embodiment 6

Video data can be generated by switching, as necessary, between (i) the video coding method or the video coding apparatus shown in each of Embodiments and (ii) a video coding method or a video coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the video coding method and by the video coding apparatus shown in each of Embodiments will be hereinafter described. The multiplexed data is a digital stream in the MPEG2-Transport Stream format.

FIG. 28 illustrates a structure of the multiplexed data. As illustrated in FIG. 28, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the video coding method or by the video coding apparatus shown in each of Embodiments, or in a video coding method or by a video coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

FIG. 29 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

FIG. 30 illustrates how a video stream is stored in a stream of PES packets in more detail. The first bar in FIG. 30 shows a video frame stream in a video stream. The second bar shows the stream of PES packets. As indicated by arrows denoted as yy1, yy2, yy3, and yy4 in FIG. 30, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 31 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 31. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 32 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Each of the multiplexed data information files is management information of the multiplexed data as shown in FIG. 33. The multiplexed data information files are in one to one correspondence with the multiplexed data, and each of the files includes multiplexed data information, stream attribute information, and an entry map.

As illustrated in FIG. 33, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

As shown in FIG. 34, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In Embodiment 6, the multiplexed data to be used is of a stream type included in the PMT. Furthermore, when the multiplexed data is recorded on a recording medium, the video stream attribute information included in the multiplexed data information is used. More specifically, the video coding method or the video coding apparatus described in each of Embodiments includes a step or a unit for allocating unique information indicating video data generated by the video coding method or the video coding apparatus in each of Embodiments, to the stream type included in the PMT or the video stream attribute information. With the configuration, the video data generated by the video coding method or the video coding apparatus described in each of Embodiments can be distinguished from video data that conforms to another standard.

Furthermore, FIG. 35 illustrates steps of the video decoding method according to Embodiment 6. In Step exS100, the stream type included in the PMT or the video stream attribute information is obtained from the multiplexed data. Next, in Step exS101, it is determined whether or not the stream type or the video stream attribute information indicates that the multiplexed data is generated by the video coding method or the video coding apparatus in each of Embodiments. When it is determined that the stream type or the video stream attribute information indicates that the multiplexed data is generated by the video coding method or the video coding apparatus in each of Embodiments, in Step exS102, decoding is performed by the video decoding method in each of Embodiments. Furthermore, when the stream type or the video stream attribute information indicates conformance to the conventional standards, such as MPEG-2, MPEG4-AVC, and VC-1, in Step exS103, decoding is performed by a video decoding method in conformity with the conventional standards.

As such, allocating a new unique value to the stream type or the video stream attribute information enables determination whether or not the video decoding method or the video decoding apparatus that is described in each of Embodiments can perform decoding. Even when multiplexed data that conforms to a different standard, an appropriate decoding method or apparatus can be selected. Thus, it becomes possible to decode information without any error. Furthermore, the video coding method or apparatus, or the video decoding method or apparatus in Embodiment 6 can be used in the devices and systems described above.

Embodiment 7

Each of the video coding method, the video coding apparatus, the video decoding method, and the video decoding apparatus in each of Embodiments is typically achieved in the form of an integrated circuit or a Large Scale Integrated (LSI) circuit. As an example of the LSI, FIG. 36 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 8

When video data generated in the video coding method or by the video coding apparatus described in each of Embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

In order to solve the problem, the video decoding apparatus, such as the television ex300 and the LSI ex500 is configured to determine to which standard the video data conforms, and switch between the driving frequencies according to the determined standard. FIG. 37 illustrates a configuration ex800 in Embodiment 8. A driving frequency switching unit ex803 sets a driving frequency to a higher driving frequency when video data is generated by the video coding method or the video coding apparatus described in each of Embodiments. Then, the driving frequency switching unit ex803 instructs a decoding processing unit ex801 that executes the video decoding method described in each of Embodiments to decode the video data. When the video data conforms to the conventional standard, the driving frequency switching unit ex803 sets a driving frequency to a lower driving frequency than that of the video data generated by the video coding method or the video coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 36. Here, each of the decoding processing unit ex801 that executes the video decoding method described in each of Embodiments and the decoding processing unit ex802 that conforms to the conventional standard corresponds to the signal processing unit ex507 in FIG. 34. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 6 is probably used for identifying the video data. The identification information is not limited to the one described in Embodiment 6 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 39. The driving frequency can be selected by storing the look-up table in the buffer ex508 and in an internal memory of an LSI, and with reference to the look-up table by the CPU ex502.

FIG. 38 illustrates steps for executing a method in Embodiment 8. First, in Step exS200, the signal processing unit ex507 obtains identification information from the multiplexed data. Next, in Step exS201, the CPU ex502 determines whether or not the video data is generated by the coding method and the coding apparatus described in each of Embodiments, based on the identification information. When the video data is generated by the video coding method and the video coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the video coding method and the video coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG4-AVC is larger than the processing amount for decoding video data generated by the video coding method and the video coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the video coding method and the video coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the video coding method and the video coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the video coding method and the video coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 9

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the video decoding method described in each of Embodiments and the decoding processing unit that conforms to the conventional standard, such as MPEG-2, MPEG4-AVC, and VC-1 are partly shared. Ex900 in FIG. 40A shows an example of the configuration. For example, the video decoding method described in each of Embodiments and the video decoding method that conforms to MPEG4-AVC have, partly in common, the details of processing, such as entropy coding, inverse quantization, deblocking filtering, and motion compensated prediction. The details of processing to be shared probably includes use of a decoding processing unit ex902 that conforms to MPEG4-AVC. In contrast, a dedicated decoding processing unit ex901 is probably used for other processing unique to the present invention. Since the present invention is characterized by a transformation unit in particular, for example, the dedicated decoding processing unit ex901 is used for inverse transform. Otherwise, the decoding processing unit is probably shared for one of the entropy coding, inverse quantization, deblocking filtering, and motion compensated prediction, or all of the processing. The decoding processing unit for implementing the video decoding method described in each of Embodiments may be shared for the processing to be shared, and a dedicated decoding processing unit may be used for processing unique to that of MPEG4-AVC.

Furthermore, ex1000 in FIG. 40B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the video decoding method in the present invention and the conventional video decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of Embodiment 9 can be implemented by the LSI ex500.

As such, reducing the scale of the circuit of an LSI and reducing the cost are possible by sharing the decoding processing unit for the processing to be shared between the video decoding method in the present invention and the video decoding method in conformity with the conventional standard.

INDUSTRIAL APPLICABILITY

The present invention is applicable to a coding apparatus which codes audio, still images, and video and to a decoding apparatus which decodes data coded by the coding apparatus. For example, the present invention is applicable to various audio-visual devices such as audio devices, cellular phones, digital cameras, BD recorders, and digital televisions.

The invention claimed is:

1. A method of decoding a current picture of video using a plurality of reference pictures, the method comprising:
    for each of the reference pictures, parsing a parameter related to a picture quality of the reference picture;
    creating a first list of reference pictures including the plurality of reference pictures sorted based on the parameter and a temporal distance of the reference picture to the current picture;
    decoding the current picture of the video using one or more of the reference pictures in the first list with priority based on an order in which the reference pictures are sorted in the first list;
    creating a second list of reference pictures and a third list of reference pictures, each of the second and third lists sorted based on a temporal distance to the current picture; and
    determining if the second list matches the third list,
    wherein, if the second list matches the third list, creating the first list of reference pictures sorted based on the parameter and the temporal distance, and decoding the current picture of the video using the first list of reference pictures; and
    wherein, if the second list does not match the third list, decoding the current picture of the video using the second list and the third list.

2. The method according to claim 1, comprising:
    determining if a flag is of a predefined value;
    wherein, if the flag is of the predefined value, creating the first list of reference pictures sorted based on the parameter and temporal distance, and
    wherein, if the flag is not of the predefined value, creating the first list of reference pictures sorted based on an inter-picture prediction dependency of the reference pictures.

3. The method according to claim 1, comprising:
    determining if the reference picture comprises a flag having a predefined value, for each of the plurality of reference picture;
    wherein, if the flag of the reference picture is of a predefined value, labeling the reference picture as a first type of reference picture;
    wherein, if the flag of the reference picture is not of a predefined value, labeling the reference picture as a second type of reference picture;

creating the first list of reference pictures sorted by ordering the reference picture labeled as the first type higher in the first list than the reference picture labeled as the second type.

4. The method according to claim 3, wherein the reference picture labeled as the first type is ordered at the top of the first list.

5. The method according to claim 1, wherein for each of the reference pictures, a reference picture of a higher picture quality is placed closer to the top of the first list, and is identified in the first list with fewer bits.

6. An apparatus for decoding a current picture of video using a plurality of reference pictures, the apparatus comprising:
- a parsing unit configured to parse, for each of the reference pictures, a parameter related to a picture quality of the reference picture;
- a list creation unit configured to create a first list of reference pictures including the plurality of reference pictures sorted based on the parameter and a temporal distance of the reference picture to the current picture;
- a decoding section configured to decode the current picture of the video using one or more of the reference pictures in the first list with priority based on an order in which the reference pictures are sorted in the list;

wherein the list creation unit is configured to create a second list of reference pictures and a third list of reference pictures, each of the second and third lists sorted based on a temporal distance to the current picture, the decoding section is configured to determine if the second list matches the third list, if the second list matches the third list, the decoding section is configured to create the first list of reference pictures sorted based on the parameter and the temporal distance, and decode the current picture of the video using the first list of reference pictures, and if the second list does not match the third list, the decoding section is configured to decode the current picture of the video using the second list and the third list.

* * * * *